(12) United States Patent
Avera et al.

(10) Patent No.: US 10,157,207 B2
(45) Date of Patent: Dec. 18, 2018

(54) SYSTEM FOR SUPPLEMENTAL DATA REPORTING UTILIZING DATA RECORD PROPERTIES

(71) Applicant: Bank of America Corporation, Charlotte, NC (US)

(72) Inventors: Steven M. Avera, Jacksonville, FL (US); Tanner Maxwell, Jacksonville, FL (US); Willie Arrington, II, Jacksonville, FL (US); Jennifer Brooks, Jacksonville, FL (US); Jessica Barry, St. Johns, FL (US); Lisa Halbach, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 453 days.

(21) Appl. No.: 14/943,692

(22) Filed: Nov. 17, 2015

(65) Prior Publication Data

US 2017/0139993 A1    May 18, 2017

(51) Int. Cl.
*G06F 17/30* (2006.01)

(52) U.S. Cl.
CPC .. *G06F 17/30477* (2013.01); *G06F 17/30312* (2013.01)

(58) Field of Classification Search
CPC .............. G06F 17/30477; G06F 17/30312
USPC .................................................. 707/769
See application file for complete search history.

(56) References Cited

U.S. PATENT DOCUMENTS

| | | | | |
|---|---|---|---|---|
| 5,512,406 A | * | 4/1996 | Takeda | G03G 9/0819 430/108.11 |
| 5,517,406 A | * | 5/1996 | Harris | G06Q 40/02 705/30 |
| 5,802,499 A | * | 9/1998 | Sampson | G06Q 40/02 705/35 |
| 5,930,774 A | | 7/1999 | Chennault | |
| 6,470,625 B1 | * | 10/2002 | Byun | A01G 9/023 47/82 |
| 7,275,046 B1 | | 9/2007 | Tritt et al. | |

(Continued)

OTHER PUBLICATIONS

Dec. 15, 2017—U.S. Final Office Action—U.S. Appl. No. 14/943,729.

(Continued)

*Primary Examiner* — Mark E Hershley
(74) *Attorney, Agent, or Firm* — Banner & Witcoff, Ltd.; Michael A. Springs

(57) ABSTRACT

A supplemental data report generation device may interface with one or more databases to generate a supplemental data report document for reporting actions of an aggregate user reporting entity. The device may retrieve a set of criteria for the supplemental data report, such as a set of items to be covered by the report, an action property, and a reporting rule based on the action property. The device may review action records stored in a record data store and identify actions that have the action property. Operational attributes associated with the plurality of actions may be identified through the action records. The device may use the operational attributes associated with the action records to determine if they are subject to the reporting rule, and these actions may be included in the supplemental data report.

13 Claims, 16 Drawing Sheets

(56) References Cited

U.S. PATENT DOCUMENTS

| | | | |
|---|---|---|---|
| 7,526,444 B2* | 4/2009 | Miles | G06Q 40/00 705/35 |
| 7,574,403 B2* | 8/2009 | Webb | G06Q 20/10 705/14.17 |
| 7,680,719 B1* | 3/2010 | Brady | G06Q 40/06 705/36 R |
| 7,991,671 B2* | 8/2011 | Hadi | G06Q 40/00 705/36 R |
| 8,185,439 B2 | 5/2012 | Webb et al. | |
| 8,195,657 B1* | 6/2012 | Dellovo | G06F 17/30702 707/733 |
| 8,224,730 B2 | 7/2012 | Hadi et al. | |
| 8,234,188 B1* | 7/2012 | Phillips | G06Q 40/12 705/30 |
| 8,392,304 B1 | 3/2013 | Phillips et al. | |
| 8,452,704 B2* | 5/2013 | Barbara | G06Q 20/04 705/39 |
| 8,600,864 B2 | 12/2013 | Hadi et al. | |
| 8,626,636 B2* | 1/2014 | Sauter | G06Q 20/042 705/35 |
| 8,712,881 B1 | 4/2014 | Phillips et al. | |
| 8,739,278 B2* | 5/2014 | Varghese | G06F 21/31 726/22 |
| 8,744,942 B1 | 6/2014 | Phillips et al. | |
| 9,286,637 B1* | 3/2016 | Keld | G06Q 40/06 |
| 2001/0005022 A1* | 6/2001 | Ogura | B82Y 10/00 257/103 |
| 2001/0023414 A1* | 9/2001 | Kumar | G06F 17/30867 705/35 |
| 2002/0055898 A1 | 5/2002 | Burakoff et al. | |
| 2003/0018557 A1* | 1/2003 | Gilbert | G06Q 40/02 705/36 R |
| 2003/0023477 A1 | 1/2003 | Fergusson et al. | |
| 2003/0110106 A1* | 6/2003 | Deshpande | G06Q 40/00 705/35 |
| 2003/0154151 A1 | 8/2003 | Biondi et al. | |
| 2004/0039601 A1 | 2/2004 | Anderson | |
| 2005/0114241 A1* | 5/2005 | Hirsch | G06Q 40/00 705/35 |
| 2005/0240456 A1* | 10/2005 | Ward | G06Q 40/00 705/35 |
| 2006/0085469 A1 | 4/2006 | Pfeiffer et al. | |
| 2007/0239473 A1* | 10/2007 | Picolli | G06Q 50/26 705/325 |
| 2007/0265951 A1 | 11/2007 | Hagerman et al. | |
| 2007/0282761 A1 | 12/2007 | Deputy et al. | |
| 2008/0147525 A1* | 6/2008 | Allen | G06O 40/00 705/30 |
| 2008/0222098 A1 | 9/2008 | Simpson | |
| 2009/0037228 A1* | 2/2009 | Engel | G06Q 10/10 705/4 |
| 2009/0063216 A1* | 3/2009 | Kerimov | G06F 21/6218 705/7.41 |
| 2009/0222294 A1 | 9/2009 | Dick et al. | |
| 2010/0325065 A1 | 12/2010 | Lego et al. | |
| 2011/0275364 A1* | 11/2011 | Austin | H04L 41/06 455/423 |
| 2011/0282715 A1* | 11/2011 | Nguyen | G06Q 10/06 705/7.39 |
| 2013/0018910 A1 | 1/2013 | Reddington et al. | |
| 2013/0073438 A1* | 3/2013 | Jabbour | G06Q 40/00 705/30 |
| 2013/0124392 A1 | 5/2013 | Achanta et al. | |
| 2014/0114817 A1 | 4/2014 | Moore et al. | |
| 2014/0207592 A1* | 7/2014 | Kavis | G06Q 40/12 705/21 |
| 2014/0372341 A1 | 12/2014 | Brown, III | |
| 2015/0019537 A1 | 1/2015 | Neels et al. | |
| 2016/0019650 A1 | 1/2016 | Labriola et al. | |
| 2017/0139924 A1 | 5/2017 | Avera et al. | |
| 2017/0139993 A1 | 5/2017 | Avera et al. | |
| 2017/0154323 A1 | 6/2017 | Bohrer et al. | |
| 2017/0186089 A1 | 6/2017 | Brown, III | |
| 2017/0278193 A1 | 9/2017 | Lynch et al. | |

OTHER PUBLICATIONS

Jun. 29, 2017—U.S. Non-Final Office Action—U.S. Appl. No. 14/943,729.

Wikipedia, "Omnibus Customer Securities Accounts," 1 page, available at <https://en.wikipedia.org/wiki/Omnibus_Customer_Securities_Accounts> (accessed Sep. 30, 2015).

May 3, 2018—U.S. Non-Final Office Action—U.S. Appl. No. 14/943,712.

* cited by examiner

200

SUPPLEMENTAL DATA REPORT FOR FUND COMPANY 1 PRODUCTS
Provided by Reporting Company on Behalf of its Clients
QX 2015

...

210 — STATE OF SALE REPORT – TX, New Subscriptions

Fund Company 1 Alpha: X% institutional customers
Y% managed customers, accredited } 212
Z% retail customers Fund Company 1 Beta: X% institutional customers
Y% managed customers, accredited } 214
Z% retail customers 220 — STATE OF SALE REPORT – WV, New Subscriptions Fund Company 1 Alpha: X% institutional customers
Y% managed customers, accredited
Z% retail customers, first subscription
W% retail customers, second or subsequent subscription } 222

Fund Company 1 Beta: X% institutional customers
Y% managed customers, accredited } 224
Z% retail customers

Supplemental Data Reporting Interface

| HOME | BUILD REPORT | UPLOAD REPORT | VIEW AND PUBLISH |

View and Release Reports

Reports Stored in Staging Data Store, Ready for Review and Release.

FUNDCO1

| | Name | Date | Type | Link | |
|---|---|---|---|---|---|
| O | FCO_Alpha_Concentration_Q#_2015 | X/1/2015 | Concentration | View | Release |
| O | FCO_Beta_Concentration_Q#_2015 | X/1/2015 | Concentration | View | Release |
| O | FCO_Alpha_State_Exemption_Q#_2... | X/1/2015 | State of Sale | View | Release |
| O | FCO_Alpha_State_DrillDown_TX_Q#... | X/1/2015 | State of Sale | View | Release |
| O | FCO_Alpha_State_DrillDown_WV_Q#... | X/1/2015 | State of Sale | View | Release |

OTHERCO2

| | Name | Date | Type | Link | |
|---|---|---|---|---|---|
| O | OCO_Gamma_Dividend_Forecast_Q... | X/1/2015 | Dividend | View | Release |

Release Selected    Delete Selected

FIG. 11A

Supplemental Data Reporting Interface

| HOME | BUILD REPORT | UPLOAD REPORT | VIEW AND PUBLISH |

Now viewing OCO_Gamma_Dividend_Forecast_Q#_2015.pdf – X/1/2015

DIVIDEND ELECTION REPORT – OTHERCO2 GAMMA – Q# 2015

| ReportCo Omnibus: | $######4 |
|---|---|
| Dividend Elections: | X% have pre-elected cash dividend (X+% estimated) |
| | Y% have pre-elected dividend reinvestment (Y+% estimated) |
| | Z% election pending for Q# 2015 |
| | |
| Historical Elections: | -In QX 2015- |
| | X% elected cash dividend |
| | Y% elected dividend reinvestment |
| | Z% of election pending ultimately elected cash dividend |

EDIT    DRILLDOWN    RELEASE    DELETE

| Supplemental Data Reporting Interface |
|---|
| HOME | BUILD REPORT | UPLOAD REPORT | VIEW AND PUBLISH |

Building a New Supplemental Data Report – Prebuilt Report Type

Select Representative Account: HouseAcct1

Report Level: Product Family

Product Group: FundCo1

Report Type: State of Sale – Client Exemption Report
Concentration Report
Dividend Election Forecast
Inflow Prediction Report
....

Frequency: Once  Monthly  Quarterly

CREATE REPORT

| Supplemental Data Reporting Interface |
|---|
| HOME | BUILD REPORT | UPLOAD REPORT | VIEW AND PUBLISH |

Building a New Supplemental Data Report – Custom Report

Select Representative Account: HouseAcct1

Report Level: CUSIP

Product Group: OtherCo2

Product: OtherCo2 Gamma

Report Criteria:
Transaction          ClientFields
State of Sale        Classification
Concentration Percentage  Holdings
New Subscription     Dividend Election Frequency: Once  Monthly  Quarterly

| Supplemental Data Reporting Interface |||||
|---|---|---|---|---|
| HOME | BUILD REPORT | UPLOAD REPORT | VIEW AND PUBLISH ||

Modify Product Group – FundCo1

| Product Group: | FundCo1 | | | |
|---|---|---|---|---|
| Products: | FundCo1 Alpha | | Remove Modify | |
| | FundCo1 Beta | | Remove Modify | |
| | | | Add | |
| Scheduled Reports: | Name | Type Last | Freq | Delivery |
| | FCO_Alpha_Concentration | Conce..$/1/15 | Quarte.. | Manual Release |
| | FCO_Beta_Concentration | Conce..$/1/15 | Quarte.. | Manual Release |
| | FCO_Alpha_State_Exemption | State of$/1/15 | Monthly | Automatic |
| | Create New Scheduled Report | | | |
| Delivery: | O External Facing Website | | | |
| | O E-Mail | Fund Company 1 @@@@@@@@ | | |

FIG. 11E

SYSTEM FOR SUPPLEMENTAL DATA REPORTING UTILIZING DATA RECORD PROPERTIES

BACKGROUND

Aspects of the disclosure relate to computer hardware and software. In particular, one or more aspects of the disclosure generally relate to computer hardware and software for providing supplemental data reporting documents generated based on records stored in one or more databases and corresponding to one or more actions of an aggregate user recording entity for a collection of users.

In many computer systems, users may maintain a user recording entity with a provider to utilize services of that provider. The provider may utilize the user recording entity to track information corresponding to actions attributable to the user in one or more databases. In particular, the user may be electronically represented by a user recording entity on the provider's computer systems. The user may be able to initiate various actions through use of the user recording entity. For example, the user may request a service provided by the provider and the provider may record the service against the user recording entity. Actions attributable to the user via the user recording entity may be tracked in one or more databases. The databases may store a plurality of data records comprising details associated with each action.

Providers typically have a very large number of users requesting their services, and may be forced to maintain a large number of user recording entities to track actions attributable to each individual user. As the number of users grows, and as the number of actions attributable to each user grows, the system may be forced to manage a large number of data records. While this collection of data records may provide significant value to the provider, it may be difficult to properly assess the impact or net effect of a large number of recorded actions. Thus, varied database reporting systems have been developed to produce reports regarding information stored in the data records of such databases. Database reporting systems may accept one or more criteria for a report and generate a reporting document that includes information about the data records stored in the database selected and processed based on the criteria for the report. Information in the reporting document may be associated with the individual user reporting entities maintained by the computer systems of the provider.

However, at times it may be desirable to have a single user reporting entity correspond to more than one user. In some circumstances, an aggregate user reporting entity may be created corresponding to a collective group of users. For example, each user of the collective group of users may belong to or be associated with a common representative organization. The organization may manage the aggregate user reporting entity maintained with a provider on behalf of the users in the collective group of users. The organization may request services from the provider on behalf of individual users via the aggregate user reporting entity. Although the actions ultimately are attributable to the individual users, from the provider's end they each appear associated with the aggregate user reporting entity rather than an individual user reporting entity associated with the particular user. This may provide certain benefits, such as reducing the number of user reporting entities that the provider must maintain and track individually. It may also provide benefits for the organization representing the collective group of users, as the organization may be able to maintain as confidential the identities of the individual users.

Use of an aggregate user reporting entity may lead to a lack of transparency for the providers. Providers may find value in details associated with the underlying users associated with actions made by the aggregate user reporting entity. However, because each action is identified as associated with the aggregate user reporting entity for the organization rather than an individual user, the provider may encounter difficulties in assessing the nature of the actions and meeting its own reporting requirements.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to computer systems that provide effective, efficient, scalable, and convenient ways of generating supplemental data reporting documents regarding one or more attributes of a set of actions associated with an aggregate user reporting entity based on data records stored in a database. An organization maintaining the aggregate user reporting entity for requesting services with a provider on behalf on a collective group of users may maintain a database comprised of data records storing information regarding each action made by the aggregate user reporting entity. The data records may include information associating an individual user of the collective group of users with a particular action or data record. A database reporting engine may process the stored data records corresponding to actions of the aggregate user reporting entity and generate a supplemental data report including operational information about particular actions of the aggregate user reporting entity based on one or more criteria for the report. The operational information may relate to the nature, characteristics, and/or attributes of an underlying individual user of the collective group of users associated with the particular action. The system may generate a user interface comprising a display of the supplemental data report, and a reviewing user may review the supplemental data report and approve it for publication to a third party, such as the service provider with whom the aggregate user reporting entity is maintained. As a result, the organization may be able to provide selected operational information regarding the nature and characteristics of a set of actions while maintaining confidential the identity and other characteristics of users represented by the organization.

One or more aspects described herein may provide a system comprising a record data store, a reporting rule data store, a report staging data store, and a supplemental data report generation device. The record data store may be configured to store a plurality of action records associated with an aggregated user reporting entity. The aggregate user reporting entity may correspond to a plurality of users. The reporting rule data store may be configured to store one or more reporting rules associated with one or more action properties. The report staging data store may be configured to store a plurality of reports. The supplemental data report generation device may comprise at least one processor and memory storing computer-readable instructions. The instructions may configure the supplemental data report generation device to receive a set of criteria for a supplemental data report corresponding to actions of the aggregate user reporting entity. The set of criteria may comprise a set of items covered by the supplemental data report and a first action property. The supplemental data report generation device may retrieve, from the reporting rule data store, a first reporting rule based on the first action property. The supplemental data report generation device may retrieve, from the record data store, one or more action records of the plurality of action records based on the set of items and first action property. The supplemental data report generation device may determine, based on a set of operational attributes associated with the one or more action records, a subset of actions that match the first reporting rule. The supplemental data report generation device may generate the supplemental data report based on the set of items and the subset of actions. The generated supplemental data report may be stored in the report staging data store.

Further aspects of the disclosure relate to computer systems that provide effective, efficient, scalable, and convenient ways of providing reporting documents regarding one or more attributes of a set of transactions. More specifically, aspects of the disclosure relate to generating supplemental data reports for transactions of a representative account corresponding to a plurality of clients based on one or more criteria for the supplemental data report.

For example, one or more aspects of the disclosure relate to a system for generating supplemental data reports for transactions of a representative account. As described in further detail below, a supplemental data report generation device in the system may utilize stored transaction records and associated operational attribute data to generate a supplemental data report providing additional information about transactions by the representative account associated with a set of products, such as a group of mutual funds provided by a fund company. The supplemental data report generation device may gather the appropriate records from various data stores as described herein and generate the supplemental data report based on a set of criteria for the report. The criteria for the report may be configured by users through a front-end device providing access to the rest of the system. The front-end device may also allow users to review and approve the supplemental data reports before they are published to a third party. Advantageously, by providing supplemental data reports in accordance with one or more aspects discussed in greater detail below, an institution may provide partial transparency into operational attributes associated with transactions of a representative account, thereby enhancing the ability of the fund companies (or other third parties) to assess liquidity conditions and meet regulatory obligations.

One or more aspects described herein relate to systems for generating supplemental data reports for transactions of a representative account that have certain transaction properties. A supplemental data report generation device may interface with one or more data stores to generate the supplemental data report. The device may retrieve a set of criteria for the supplemental data report, such as a set of products to be covered by the report, a transaction property, and a reporting rule based on the transaction property. For example, the transaction property may be a state of sale associated with a transaction and the reporting rule may be an exemption rule associated with the state of sale. The device may review transaction records of the representative account stored in a transaction record data store and identify a plurality of transactions that have the transaction property. Operational attributes associated with the plurality of transactions may be identified through the transaction records. The operational attributes may correspond to attributes of a client of the representative account associated with a specific transaction record. The device may use the operational attributes associated with each of the transaction records to determine if they are subject to the reporting rule, and these transactions may be included in the supplemental data report. Once generated, the supplemental data report may be stored in a report staging data store for review and approval.

One or more aspects described herein may provide a system for generating a supplemental data report corresponding to transactions of a representative account, wherein the representative account corresponds to a first plurality of customers. The system may comprise a transaction record data store, a reporting rule data store, a report staging data store, and a supplemental data report generation device. The transaction record data store may be configured to store a plurality of transaction records associated with the representative account. The reporting rule data store may be configured to store one or more reporting rules associated with one or more transaction properties. The report staging data store may be configured to store a plurality of reports. The supplemental data report generation device may use operational attribute information associated with each of the transaction records to determine content for the supplemental data report and to generate the supplemental data report.

The supplemental data report generation device may receive a set of criteria for the supplemental data report. The set of criteria may include a set of products for the report, transaction properties for transactions that are to be included in the report, and/or one or more reporting rules used to select the customers and information to be included in the report. The device may retrieve transaction records associated with the representative account from the transaction record data store based on the set of products and the one or more transaction properties. The device may determine a subset of transactions that match the one or more reporting rules based on a set of operational attributes associated with the one or more transaction records. The set of operational attributes may correspond to attributes of customers associated with the set of products based on the one or more transaction records. In some arrangements, the operational attributes may be included in the transaction records. In other embodiments, the supplemental data report generation device may retrieve the set of operational attributes associated with the one or more transaction records from an operational attribute data store. Based on the set of products and the subset of transactions, the device may generate the supplemental data report. The generated supplemental data report may be stored in the report staging data store for review and approval prior to publication of the supplemental data report.

In some embodiments, the supplemental data report generation device may receive the set of criteria from a user of a front-end system that allows the user to configure the criteria for the supplemental data report. In other embodiments, the system may receive the set of criteria for the supplemental data report from a report definition data store configured to store sets of criteria associated with various reports. The reports may be manually initiated responsive to a user request to generate the report, or the reports may be scheduled for automatic generation at appropriate intervals.

In some arrangements, the supplemental data report generation device may retrieve the one or more reporting rules based on the one or more transaction properties. For example, the system may look up one or more exemption rules associated with a transaction property such as a state of sale. As an example, the exemption rule associated with a particular state may comprise a rule based on a classification of the underlying customer for the transaction. As another example, the exemption rule associated with the particular state may comprise a prior ownership rule based on a transaction history of the underlying customer.

In some examples, the supplemental data report generation device may calculate one or more aggregate metrics associated with the set of products and the subset of transactions based at least in part on portions of the operational attributes corresponding to a subset of operational attribute fields associated with the transaction records. For example, the operational attribute fields stored in the transaction record data store and/or stored in an operational attribute data store may comprise one or more personally identifiable information fields and the subset of operational attribute fields may be selected to omit the one or more personally identifiable information fields.

In some example arrangements, the transaction properties may comprise a first transaction property and a second transaction property, and the supplemental data report generation device may generate a first report section for the first transaction property and generate a second report section for the second property, wherein a report section for a given property is generated based on a respective subset of transaction records and/or customers corresponding to the given property.

In some embodiments, the transaction data may correspond to mutual fund subscription transactions made by the representative account and the set of products may comprise a defined family of mutual funds.

One or more aspects described herein may provide a method for generating a supplemental data report for transactions of a representative account corresponding to a first plurality of customers. The method may comprise receiving, by a supplemental data report generation device, a set of criteria for the supplemental data report. The set of criteria may comprise a set of products covered by the supplemental data report and one or more transaction properties. The method may further comprise retrieving a first plurality of transaction records from a transaction data store corresponding to the representative account based on the set of products. The device may determine a second plurality of transaction records selected from the first plurality of transaction records based on a given transaction record having the one or more transaction properties. The method may also comprise determining, based on operational attributes corresponding to the second plurality of transaction records, a third plurality of transaction records that match one or more reporting rules associated with the one or more transaction properties. The third plurality of transaction records may be a subset of the second plurality of transaction records. The supplemental data report generation device may generate the supplemental data report based on the third plurality of transaction records and the operational attributes. The method may conclude with storing the generated supplemental data report in a report staging data store for review and approval prior to publication of the supplemental data report.

One or more aspects described herein may provide non-transitory computer-readable media storing instructions that cause a supplemental data report generation device to generate a supplemental data report for transactions of a representative account corresponding to a first plurality of users. The device may receive a set of criteria for the supplemental data report. The set of criteria may comprise a product covered by the supplemental data report and a first state of sale for transactions to be included in the supplemental data report. One or more reporting rules may be retrieved from a reporting rule data store. The one or more reporting rules may be associated with the first state of sale and may be based on one or more operational attributes. The device may retrieve, from a transaction data store, a first plurality of transaction records associated with the representative account that correspond to the product and have a state of sale attribute that matches the first state of sale. The device may determine a second plurality of transaction records that match the one or more reporting rules. The second plurality of transaction records may be selected from the first plurality of transaction records based on operational attributes corresponding to a first plurality of customers associated with the representative account and identified in the first plurality of transaction records. The device may generate the supplemental data report based on the second plurality of transaction records and/or the operational attributes. The generated supplemental data report may be stored in a report staging data store for review and approval prior to publication of the supplemental data report.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2, 3, and 4 depict example supplemental data reports in accordance with one or more example embodiments;

FIGS. 11A through 11E illustrate example user interface screens that may be utilized in accordance with one or more example embodiments.

DETAILED DESCRIPTION

Figure 1:
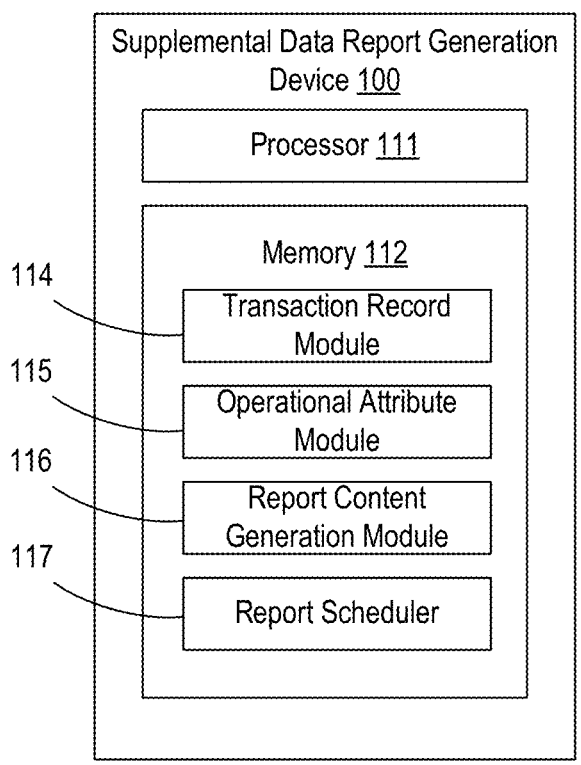
FIG. 1 depicts an illustrative supplemental data report generation device for providing supplemental data reporting for transactions of a representative account in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

One or more aspects of the disclosure generally relate to computer hardware and software for providing supplemental data report documents for records corresponding to one or more actions of an aggregate user recording entity on behalf of a collective group of users.

In many computer systems, users may maintain a user recording entity with a provider to utilize services of that provider. The provider may utilize the user recording entity to track information corresponding to actions attributable the user in one or more databases. As described above, at times it may be desirable to have a single user reporting entity correspond to more than one user. In some circumstances, an aggregate user reporting entity may be created corresponding to a collective group of users. For example, each user of the collective group of users may belong to or be associated with a common representative organization. The organization may manage the aggregate user reporting entity maintained with a provider on behalf of the users in the collective group of users. The organization may request services from the provider on behalf of individual users via the aggregate user reporting entity. Although the actions ultimately are attributable to the individual users, from the provider's end they each appear associated with the aggregate user reporting entity rather than an individual user reporting entity associated with the particular user. This may provide certain benefits, such as reducing the number of user reporting entities that the provider must maintain and track individually. It may also provide benefits for the organization representing the collective group of users, as the organization may be able to maintain as confidential the identities of the individual users.

Use of an aggregate user reporting entity may lead to a lack of transparency for the providers. Providers may find value in details associated with the underlying users associated with actions made by the aggregate user reporting entity. However, because each action is identified as associated with the aggregate user reporting entity for the organization rather than an individual user, the provider may encounter difficulties in assessing the nature of the actions and meeting its own reporting requirements.

For example, some institutions engaged in the buying and selling of mutual funds (or other assets and securities) from fund companies on behalf of clients may utilize a representative account (such as a "house account" or an omnibus account) to transact in those mutual funds without needing to create individual accounts for each client with the fund companies. Transactions associated with the clients of the institution may each be made through the representative account for the benefit of the individual clients while maintaining confidential the identities of the individual clients. Use of a representative account may help lower administrative costs of both the institution and the fund companies.

In some embodiments described further herein, the aggregate user reporting entity may be a representative account associated with a plurality of customers of an organization. The actions tracked may be transactions of the representative account that are attributable to individual customers of the plurality of customers. The organization may maintain the representative account with an institution for the purpose of engaging in such transactions on behalf of the individual users while maintaining confidential the identity of the individual users. In particular, one or more aspects of the disclosure relate to a system for generating supplemental data reports for transactions of a representative account, where the representative account corresponds to a plurality of customers.

However, the institution's desire to keep their client information confidential may be in conflict with the needs of the fund company. Fund companies may desire information about the underlying customers that invest in their funds in order to accurately assess risk and liquidity. For example, fund managers may be better able to assess and manage risk if they have information regarding the types of investors in their funds as well as how much of the fund each owns. Further, fund companies may have regulatory obligations based on the nature of the underlying customers, such as under so-called "Blue Sky Laws." A fund company operating in certain states may be obligated to pay fees on new subscriptions originating within those states. Some of the states may offer exemptions based on the type of customers behind the subscriptions, but the fund companies may be unable to determine which transactions qualify for the exemptions due to the presence of the representative account. Because each transaction is identified as associated with the representative account for the institution rather than an individual client or entity, the fund company may encounter difficulties in assessing liquidity conditions or meeting regulatory obligations. Although the institutions that maintain the representative account may internally track the underlying users associated with individual transactions, this information is not generally made available to fund companies due to confidentiality concerns or other business realities. Thus, one technical problem encountered in existing systems is a difficulty in providing operational information about the nature of transactions of a representative account while still maintaining confidential the identities of the underlying customers.

As described in further detail below, aspects described herein relate to computer systems and methods for generating supplemental data reporting documents for transactions of a representative account. A supplemental data report generation device (or an aggregator device) in the system may utilize stored transaction records and operational attribute information to generate a supplemental data report providing additional information about transactions involving the representative account associated with a selected set of products, such as a group of mutual funds provided by a fund company. The supplemental data report generation device may gather the appropriate records and generate the supplemental data report based on a set of criteria for the report. The criteria for the report may be configured by users through a front-end device providing access to the rest of the system. The front-end device may also allow users to review and approve the supplemental data reports before they are published to a third party. Advantageously, by providing supplemental data reports in accordance with one or more aspects discussed in greater detail below, an institution may provide partial transparency into client details associated with transactions of a representative account, thereby enhancing the ability of the fund companies (or other third parties) to assess liquidity conditions and meet regulatory obligations.

Some aspects described herein relate to systems for generating supplemental data reports for transactions of a representative account that have certain transaction properties. A supplemental data report generation device may be configured to generate the supplemental data report and may receive a set of criteria for the supplemental data report, such as a set of products to be covered by the report, a transaction property, and a reporting rule based on the transaction property. For example, the transaction property may be a state of sale associated with a transaction and the reporting rule may be an exemption rule associated with the state of sale. The supplemental data report generation device may review transaction records of the representative account and identify a plurality of transactions that have the transaction property. Customers associated with the plurality of transactions may be identified through the transaction records. The supplemental data report generation may use operational attribute information associated with each of the transaction records to determine if they are subject to the reporting rule, and the relevant operational attribute information may be included in the supplemental data report. The operational attribute information may be advantageously presented in aggregate form, combined over all transaction meeting the criteria for the supplemental data report. Once generated, the supplemental data report may be stored in a report staging data store for review and approval.

Other aspects described herein relate to a front-end system configured to manage generation of a supplemental data report for transactions of a representative account and allow a user to review, revise, and publish the report. The system may generate a user interface providing the user a convenient manner to input a set of criteria for the supplemental data report, such as a set of products to be covered by the report and a set of operational attribute fields to include in the report. Other criteria may include rules based on transaction properties and/or rules based on the operational attribute fields. A front-end device may command a back-end device to generate the supplemental data report. The back-end device may review transaction records of the representative account and may identify a subset of transaction records that are associated with the set of products. The back-end device may use operational attribute information associated with each of the relevant transaction records to generate the supplemental data report based on the set of operational attribute fields for the report. The front-end device may allow users to view generated supplemental data reports, modify a selected report, and select a report for publishing to an external facing website or for other delivery to a third party.

However, before discussing these and other aspects further, discussion will turn to an example supplemental data report generation device that may be used to implement one or more aspects described herein, as shown in FIG. 1.

FIG. 1 depicts an illustrative supplemental data report generation device 100 for generating supplemental data reports for transactions of a representative account in accordance with one or more example embodiments. In one or more arrangements, supplemental data report generation device 100 may be a special-purpose computing device configured to interface with a transaction record data store and/or various other data stores to retrieve and process information for inclusion in a supplemental data report as described further herein. Supplemental data report generation device 100 may include a processor 111 for controlling overall operation of supplemental data report generation device 100 and its associated components, including memory 112.

Memory 112 may include one or more program modules having instructions that, when executed by processor(s) 111, cause supplemental report generation device 100 to perform one or more functions described herein. For example, memory 112 may include modules such as transaction module 114 (which may provide functions related to transaction records for the representative account), operational attribute module 115 (which may provide functions related to operational attributes associated with the transaction records and providing information about customers associated with the representative account), report content generation module 116 (which may provide functions related to generating the supplemental data report document), and/or report scheduler 117 (which may provide functions related to initiating the generation of the supplemental data report). Also, some or all of the modules and/or computer executable instructions for supplemental data report generation device 100 may be embodied in hardware or firmware.

As will be described further below, supplemental report generation device 100 may be configured to generate a supplemental data report and may receive a set of criteria for the supplemental data report, such as a set of products to be covered by the report, a transaction property, and a reporting rule based on the transaction property. For example, the transaction property may be a state of sale associated with a transaction and the reporting rule may be an exemption rule associated with the state of sale. The set of criteria for the report may be pre-configured and stored in report scheduler 117, which may initiate the generation of the supplemental data report at a scheduled time. Supplemental report generation device 100 may utilize transaction module 114 to review transaction records of the representative account and identify a plurality of transactions that have the transaction property. Customers associated with the plurality of transactions may be identified through the transaction records using operational attribute module 115. Supplemental report generation device 100 may use operational attribute information associated with each of the transaction records to determine if the transaction is subject to the reporting rule, and these transaction records and/or operational attributes may be included in a supplemental data report generated using report content generation module 116. Once generated, the supplemental data report may be stored in a report staging data store for review and approval.

Supplemental data reporting device 100 may include a variety of computer readable media. Computer readable media may be any available media that may be accessed by supplemental data report generation device, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by supplemental data report generation device 100.

Although not required, various aspects described herein may be embodied as a method, a supplemental data report generation system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on supplemental data report generation device 100. Such a processor may execute computer-executable instructions stored on a computer-readable medium.

Having discussed a supplemental data report generation device that may be used to implement one or more aspects described herein, discussion will now turn to supplemental data reports for transactions associated with a representative account. Three examples of such supplemental data reports are illustrated in FIGS. 2, 3, and 4.

FIG. 2 illustrates a first example supplemental data report 200. Supplemental data report 200 includes state of sale report section 210 and state of sale report section 220.

As one example application of some aspects described herein, the system may generate a supplemental data report regarding transactions of the representative account that meet state-specific fee exemption rules, as illustrated in state of sale sections 210 and 220. In accordance with one or more aspects described further below, an institution may generate a supplemental data report listing relevant operational attributes associated with transactions made by the representative account in mutual funds offered by the fund company. The supplemental data report system may retrieve exemption rules associated with a transaction state of sale, such as Texas for state of sale section 210, and assess whether any customers involved in the transactions meet the exemption rules. The supplemental data report may include aggregate metrics rather than the operational attributes themselves. For example, the report may indicate that a certain percentage of the transactions in a state over a given month met the exemption rules for the state. In the illustrated example, report subsections 212, 214, 222, and 224 each provide a breakdown of the classifications of the underlying customers for which the representative account submitted new subscription transactions. Several states offer fee exemptions to mutual fund operators if the underlying customer is an institutional or managed, rather than retail, investor. Other states may offer fee exemptions where the subscription is a second or later subscription by the underlying customer. Based on this report, the fund companies may be able to more accurately report new subscriptions and claim appropriate fee exemptions.

Figure 3:
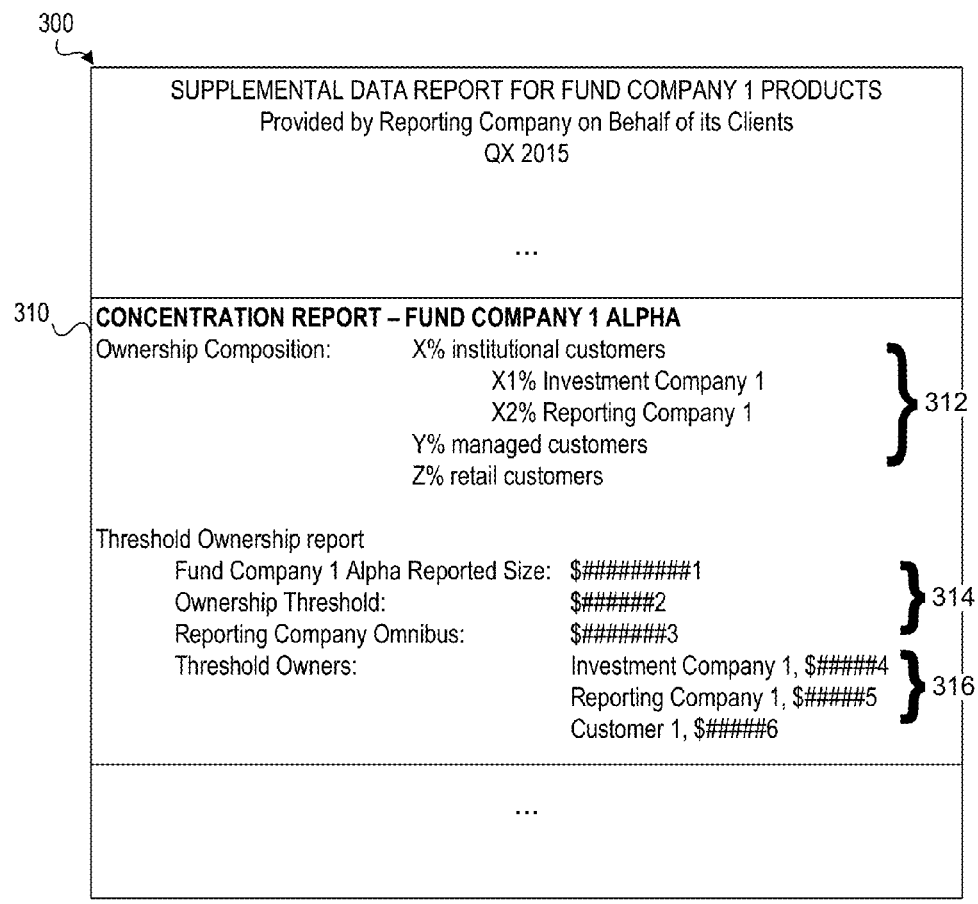
Figure 4:
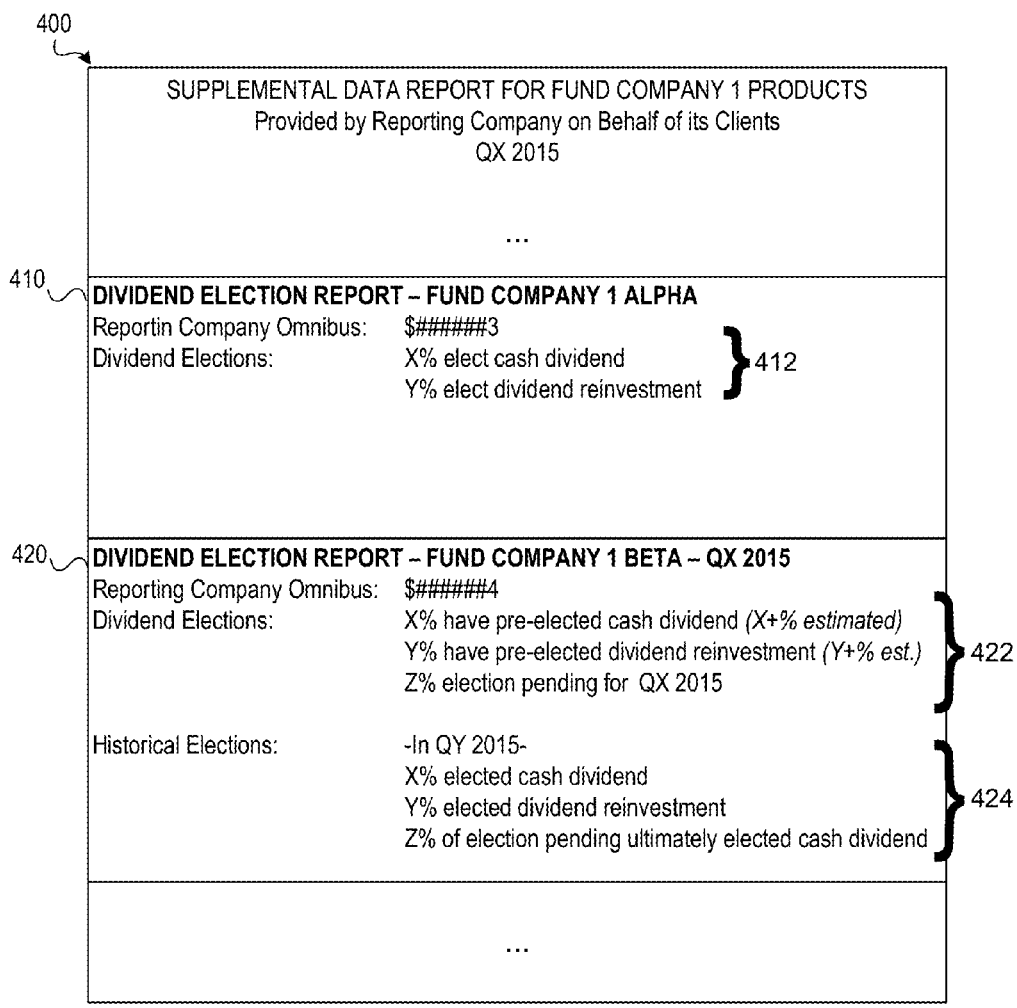

FIG. 3 illustrates a second example supplemental data report 300. Supplemental data report 300 includes concentration report section 310.

Another example application of some aspects described herein is shown in concentration report section 310. Concentration report section 310 may provide a fund manager with useful information for assessing and managing risk based on over-exposure to particular investors or classes of investors, as shown in subsections 312 and 314. Concentration report section 310 may also provide information necessary for compliance with various reporting obligations of the fund companies, such as reporting whenever a single investor exceeds a threshold level of ownership in a fund as shown in subsection 316.

FIG. 4 illustrates a third example supplemental data report 400. Supplemental data report 400 includes dividend election section 4100 and dividend election section 420.

As another example application of some aspects described herein, supplemental reports may be generated regarding dividend elections by the customers that make up the representative account. Investors frequently are provided the option to receive any dividends in either a cash payment or as additional shares (through dividend reinvestment). While the institution may elect for a cash payment on dividends in the representative account, many of the underlying customers may elect for dividend reimbursement. Reinvesting dividends may incur transaction fees for the fund company, and as a result it may be useful for the fund company to review projections regarding dividend elections across the representative portfolio. For example, in dividend election section 410, subsection 412 indicates the percentages of customers that have a cash or reinvestment election. In dividend election report 420, the supplemental data report further includes historical projection data regarding past dividend elections by customers of the representative account in subsections 422 and 424.

Figure 5A:
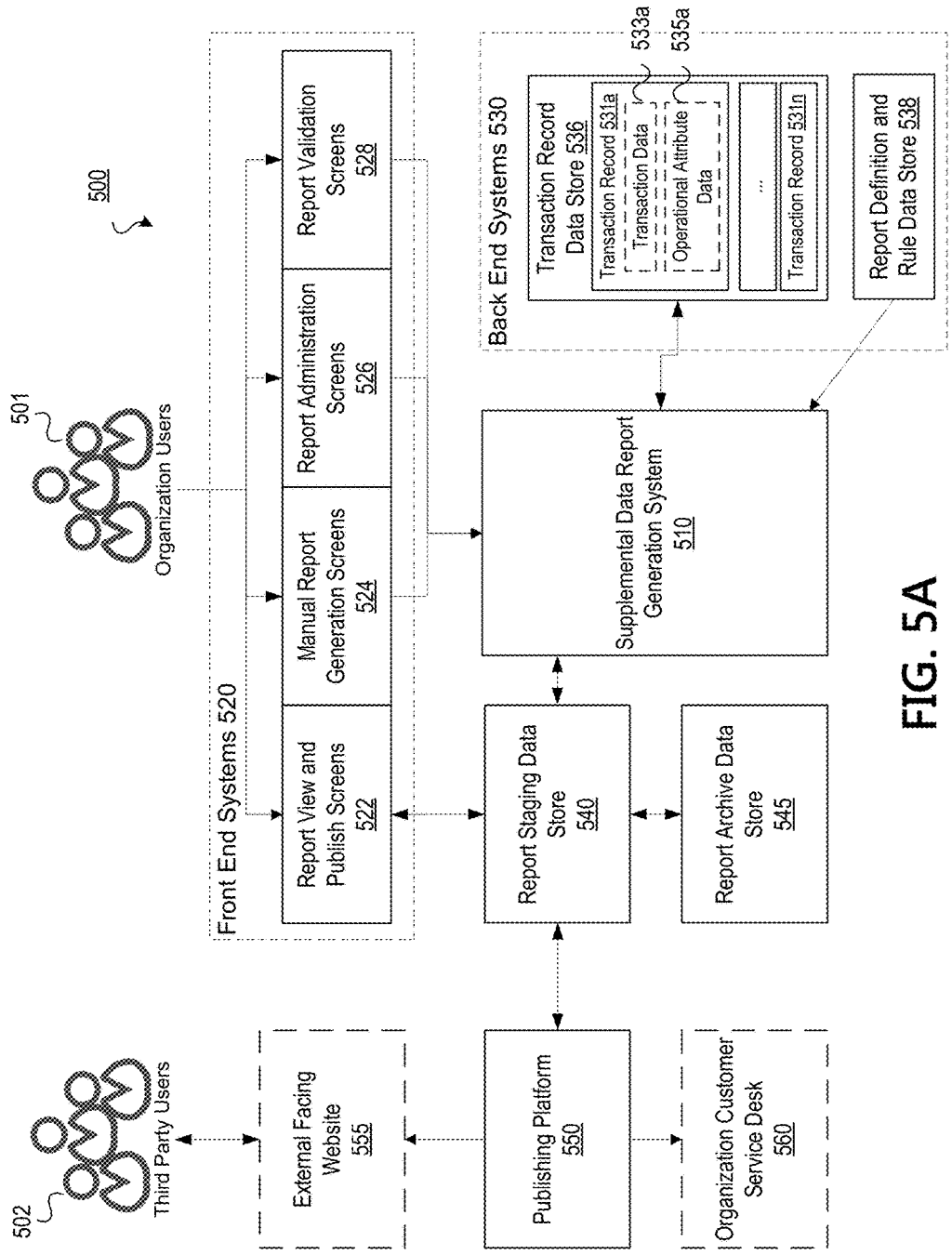
FIG. 5A depicts a first illustrative computing environment for providing supplemental data reporting for transactions of a representative account in accordance with one or more example embodiments.
Figure 5B:
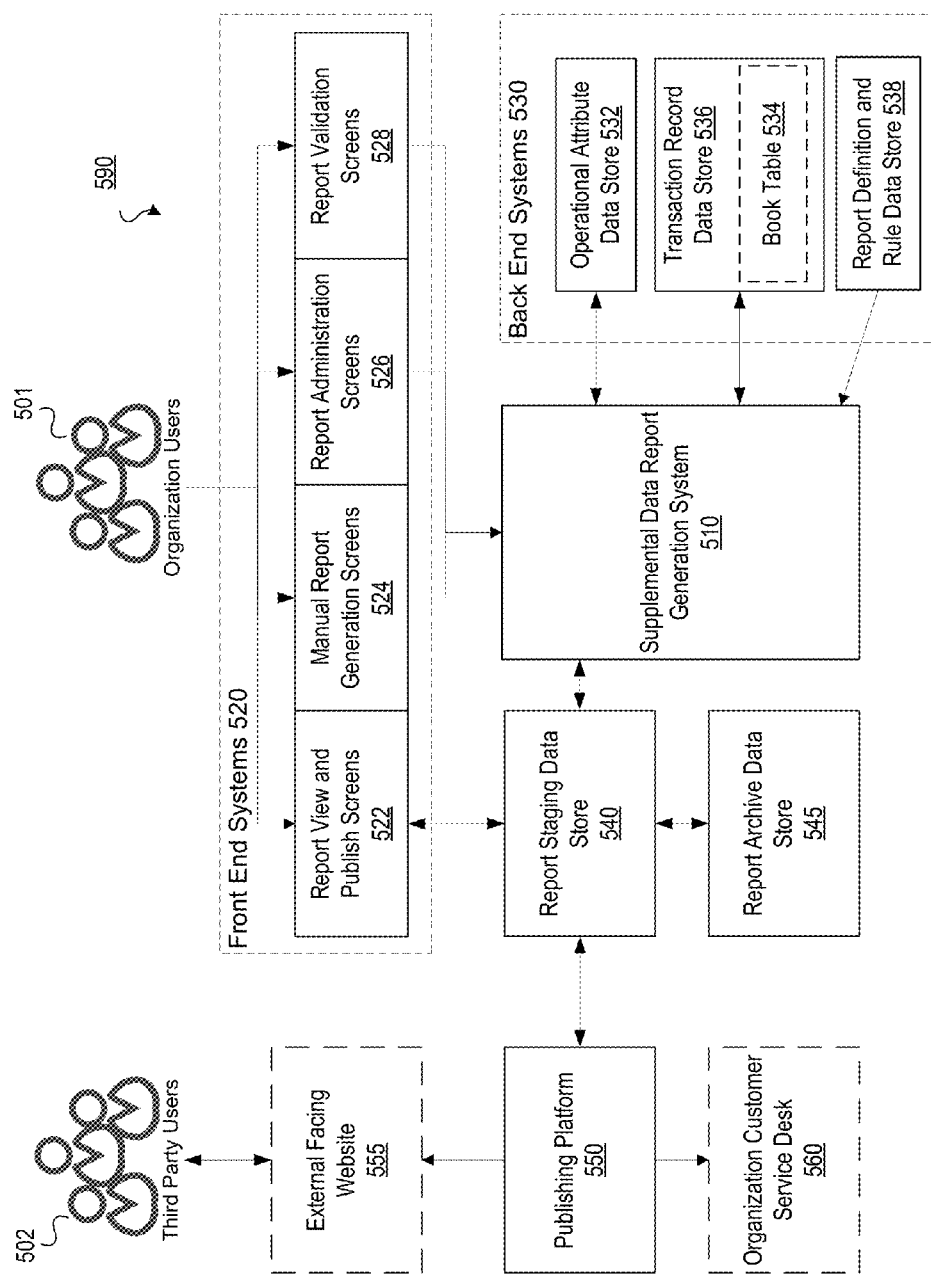
FIG. 5B depicts a second illustrative computing environment for providing supplemental data reporting for transactions of a representative account in accordance with one or more example embodiments.

Having discussed examples of supplemental data reports as shown in FIGS. 2, 3, and 4, discussion will now turn to example systems for generating supplemental data reports for transactions of a representative account in accordance with some aspects described herein, as illustrated in FIGS. 5A and 5B.

FIG. 5A illustrates an illustrative computing environment 500 for generating supplemental data reports for transactions of a representative account in accordance with one or more example embodiments. For example computing environment 500 may include a supplemental data report generation system 510 (which may correspond to supplemental data report generation device 100 of FIG. 1), front-end systems 520, back-end systems 530, report staging data store 540, report archive data store 545, and publishing platform 550. The system may be in communication with third party users 502 through a public network by way of an external facing website 555.

In one or more arrangements, and as illustrated in greater detail below, any and/or all of supplemental data report generation system 510, front-end systems 520, back-end systems 530, report staging data store 540, report archive data store 545, and publishing platform 550 may be special-purpose computing devices configured to perform specific functions. In particular, similar to supplemental data report generation device 100 of FIG. 1, Any of supplemental data report generation system 510, front-end systems 520, back-end systems 530, report staging data store 540, report archive data store 545, and publishing platform 550 may include a processor and memory storing one or more modules configured to implement one or more aspects described herein.

Computing environment 500 also may include one or more networks, which may interconnect one or more of supplemental data report generation system 510, front-end systems 520, back-end systems 530, report staging data store 540, report archive data store 545, and publishing platform 550. For example, computing environment 500 may include one or more organization networks or public networks (not shown). Organization networks and/or public networks may include one or more sub-networks (e.g., LANs, WANs, or the like). Organization networks may be associated with a particular organization (e.g., a corporation, financial institution, educational institution, governmental institution, or the like) and may interconnect one or more computing devices associated with the organization. For example, supplemental data report generation system 510, a front-end system 520, operational data stores 530, report staging data store 540, report archive data store 545, and publishing platform 550 may be associated with an organization (e.g., a financial institution), and the organization network may be associated with and/or operated by the organization, and may include one or more networks (e.g., LANs, WANs, VPNs, or the like) that interconnect supplemental data report generation system 510, a front-end system 520, back-end systems 530, report staging data store 540, report archive data store 545, and publishing platform 550 and one or more other computing devices and/or computer systems that are used by, operated by, and/or otherwise associated with the organization. The public network may connect the organization network and/or one or more computing devices connected thereto (e.g., supplemental data report generation system 510, a front-end system 520, back-end systems 530, report staging data store 540, report archive data store 545, and publishing platform 550) with one or more networks and/or computing devices that are not associated with the organization. For example, systems associated with third party users 502 might not be associated with an organization that operates the organization network (e.g., because the third party systems may be owned and/or operated by one or more entities different from the organization that operates the organization network, such as one or more providers of a product utilized by the organization, rather than being owned and/or operated by the organization itself or an employee or affiliate of the organization), and the public network may include one or more networks (e.g., the internet) that connect third party systems to publishing platform 550, such as via external facing website 555.

As described above with respect to supplemental data report generation device 100 of FIG. 1, supplemental data report generation system 510 of FIG. 5A may operate to generate a supplemental data report for transactions associated with a representative account. Supplemental data report generation system 510 may be configured to generate the supplemental data report and may receive a set of criteria for the supplemental data report, such as a set of products to be covered by the report, a transaction property, and a reporting rule based on the transaction property. Supplemental data report generation system 510 may receive the set of criteria from front-end systems 520 and/or a report definition and rules data store 538 of back-end systems 530. Supplemental data report generation system 510 may utilize transaction record data store 536 of the back-end systems 530 to review transaction records 531a-531n of the representative account and identify a plurality of transactions that meet the criteria for the report. Customers associated with a plurality of transactions may be identified through the transaction records using information stored in the transaction records. For example, the transaction records may store transaction data 533a and operational attribute data 535a. The transaction data 533a may, in some embodiments, identify the nature of the transaction (such as opening or closing), the associated asset (such as by CUSIP identifier or ticker symbol), an amount of shares and/or dollar value of the transaction, a date/time of the transaction, a state of sale of the transaction, and/or any other suitable information about the transaction. Operational attribute data 535a may, in some embodiments, identify one or more attributes of the underlying customer of the representative account that the transaction was on behalf of. Operational attribute data 535a may include, for example, customer type, investor type, customer holdings, customer transaction history, dividend elections, state of residence, and/or any other suitable information about the nature of the customer that may be relevant to forecasting and/or compliance. Supplemental data report generation system 510 may use information associated with each of the transaction records to determine which transactions are subject to the reporting rule. For example, supplemental data report generation system 510 may use operational attribute data 535a of transaction record 531a to determine that the underlying customer meets a state-specific fee exemption rule, and may include the transaction corresponding to transaction record 531a in a supplemental data report on fee exemptions.

Once the system determines the relevant information (such as the products to be covered in the report, transaction records associated with the products, and a subset of the transaction records that meet one or more report criteria), supplemental data report generation system 510 may generate the supplemental data report. The supplemental data report may include a portion of the operational attribute information associated with the transaction records in the transaction record data store 536. Additionally and/or alternatively, the supplemental data report may include one or more aggregate metrics calculated based on the operational attribute information associated with the transaction records, such as an average value or a percentage of transactions meeting certain criteria. Once generated, the supplemental data report may be stored in a report staging data store 540 for review and approval, whereupon it may be published to publishing platform 550 and/or stored in report archive data store 545. Published reports may be accessed by third party users 502 through an external facing website 555 and/or may be accessed by an organization customer service desk 560. Additional details regarding the information flows between supplemental data report generation system 510, front-end systems 520, back-end systems 530, report staging data store 540, and publishing platform 550 are provided further below with regard to FIGS. 6A and 6B.

Continuing with FIG. 5A, front-end systems 520 may generate a user interface providing the user a convenient manner to input a set of criteria for the supplemental data report, such as a set of products to be covered by the report and a set of operational attribute fields to include in the report. Other criteria may include rules based on transaction properties or rules based on the operational attribute fields. Front-end systems 520 may command supplemental data report generation system 510 to generate the supplemental data report. Supplemental data report generation system 510 may review transaction records of the representative account stored in back end systems 530 and identify a plurality of transaction records associated with the set of products. Supplemental data report generation system 510 may use operational attribute information associated with each of the plurality of transaction records stored in back end systems 530 to generate the supplemental data report based on the set of operational attribute fields.

Front end systems 520 may enable organization users 501 to configure criteria for a supplemental data report, initiate generation of the supplemental data report, review the generated supplemental data report, and queue the supplemental data report for publishing to publishing platform 550. Front-end systems 520 may provide organization users 501 with a friendly interface to the supplemental data report generation functions of supplemental data report generation system 510 and other systems within the organization network. Front end systems 520 may comprise report view and publish screens 522, manual report generation screens 524, report administration screens 526, and/or report validation screens 528.

Report view and publish screens 522 may present an organization user 501 with a listing of reports stored in report staging data store 540 and/or report archive data store 545. The user may select a report from the listing of reports, and the front-end systems 520 may generate a display of that report for the user's review. A user interface generated by front-end systems 520 may allow the user to modify the report, such as by removing content, changing content, changing formatting, changing criteria for the report, or any other suitable modifications. If the user changes the criteria for a report that had been generated by supplemental data report generation system 510, the report may be re-generated and re-displayed. The user interface may allow the user to publish the report to publishing platform 550 so that it may be accessed by third party users 502.

Two example user interfaces that may be associated with report view and publish screens 522 are illustrated in FIGS. 11A and 11B. The example user interfaces illustrated in FIGS. 11A and 11B may be generated by front-end systems 520 and presented to an organization user 501 on a display, such as a computer monitor or other display screen. FIG. 11A illustrates a view and publish user interface 1110 that may be generated by the front-end systems to present a user with a list of reports stored in the report staging data store and/or the report archive data store. User interface 1110 illustrates an example where six reports are stored in the staging data store and await review and publication. User interface 1110 may include various information about the reports stored in the staging data store, such as a name of the report, a date of the report, a report type of the report, and controls to view and/or publish the report to the publishing platform. Any other suitable type of information about the report may be included in user interface 1110 as appropriate. For example, if a report were scheduled for publication at a later date, user interface 1110 may include an indication of when the report is scheduled to be published. User interface 1110 may provide any suitable file management functions, such as allowing users to copy reports, delete reports, rename reports, move reports, release reports, and the like.

FIG. 11B illustrates a second view and publish user interface 1120 that may be generated by the front-end systems to present a user with a display of a selected report, such as a supplemental data report. User interface 1120 illustrates an example where the user has selected a dividend election report for a particular product, which may be a supplemental data report generated according to one or more aspects described herein. User interface 1120 may allow the user to view the content of the selected report and make any appropriate edits or modifications. For example, user interface 1120 may allow users to add content to the report, remove content from the report, modify content in the report, modify presentation formatting of the report, modify one or more criterion for the report, re-generate or re-run the report, and any other suitable report modification functionality. One function that may be provided through user interface 1120 is requesting the generation of a drill down report. A drill down report may be a report comprising additional and/or more detailed information about a subset of the information contained in the supplemental data report, such as a particular product of a set of products used in generating the supplemental data report. A user may request that the system generate as a drill down report an additional report and/or report section based on a portion of the data set used to generate the viewed report. For example, where the viewed report relates to a plurality of products, the user may request that a drill down report be generated to analyze the results as to a single product. Any suitable criteria may be used to generate the drill down report, and the criteria for the drill down report may be used to narrow the results of the original supplemental data report.

Returning to FIG. 5A, manual report generation screens 524 may present an organization user 501 with a user interface allowing the user 501 to configure a set of criteria for a supplemental data report. Front-end systems 520 may generate a user interface comprising a plurality of data reporting options operable that allow users to configure a supplemental data report for transactions of a representative account. The set of criteria may include, for example, any of: a product covered by the report; a set of products covered by the report; a company covered by the report; a report level for the report; a group of customers covered by the report; one or more representative accounts covered by the report; a date or date range for the report; a transaction data set for use in generating the report; a customer data set for use in generating the report; one or more transaction properties for use in selecting transactions for the report; one or more operational attributes for use in selecting transactions for the report; one or more pre-defined report templates for the report; one or more pre-defined sets of report criteria; a pre-defined report type for the report; a set of operational attribute fields for inclusion in the report; a set of transaction fields for inclusion in the report; a set of representative account fields for inclusion in the report; one or more aggregate metrics for inclusion in the report; a scheduled run date/time for the report; a recurring schedule for the report; a scheduled publish date/time for the report; a delivery method for the report; drill down criteria for the report and sub-reports; and/or any other suitable criteria for generating a supplemental data report for transactions associated with a representative account.

In some embodiments, front-end systems 520 may generate manual report generation screens 524 at multiple levels of detail depending on the needs of the user. For example, a first manual report generation screen may prompt the user to define the data set for the report (such as a fund family) and select a pre-defined report to be run on that data set (such as a dividend election report). A second manual report generation screen may provide a list of fields for inclusion in the report but may use a pre-defined set of criteria to select the appropriate transactions for inclusion in the report. A third manual report generation screen may provide advanced users with a list of most or all of the criteria supported by the system and may allow users to specify custom rules based on the criteria, such as threshold values, value ranges, and/or comparisons to other values.

Two example user interfaces that may be associated with manual report generation screens 524 are illustrated in FIGS. 11C and 11D. The example user interfaces illustrated in FIGS. 11C and 11D may be generated by front-end systems 520 and presented to an organization user 501 on a display, such as a computer monitor or other display screen. FIG. 11C illustrates a build report user interface 1130 that may be generated by the front-end systems to allow a user to build a new supplemental data report. The user may do so by configuring a set of criteria for the supplemental data report, as described above with respect to the manual report generation screens 524. For example, user interface 1130 allows a user to select a pre-built report type for use in generating the supplemental data report. In particular, user interface 1130 is illustrated as allowing a user to select a representative account that will be covered by the supplemental data report. The user may select a reporting level for the report, such as a fund family, individual fund, product group, individual product, industry, subindustry, and the like. Based on the user's selection of a reporting level, user interface 1130 may include a field to allow the user to input the product group (or other suitable entry, such as an individual fund). The user may select a pre-built report type for the supplemental data report. For example, user interface 1130 as illustrated depicts sample report types such as a State of Sale-Customer Exemption Report; a Concentration Report; a Dividend Election Forecast; and an Inflow Prediction Report. Many other types of pre-built reports may be utilized in the system, and users 501 and/or administrative users may be able to define additional pre-built reports as desired. The user may specify a frequency for the report, such as a one-time (non-recurring) report, a weekly report, a monthly report, a quarterly report, a yearly report, and/or any other suitable time frame. Once the user has specified the relevant information described above, the user may select a create report button to initiate generation of the report and/or schedule the report for later generation.

FIG. 11D illustrates another build report user interface 1140 that may be generated by the front-end systems to allow a user to build a new supplemental data report. User interface 1140 may be utilized for advanced users to allow them to specify the fields that they would like included in the report and to define custom rules for the report. As in user interface 1130, user interface 1140 allows a user to select representative account that will be covered by the supplemental data report. The user may select a reporting level for the report and, based on the user's selection of a reporting level, user interface 1140 may include a field to allow the user to input the product group (or other suitable entry, such as an individual fund). The user may be presented with a plurality of options configured to allow the user to select one or more operational attribute fields, transaction properties, and/or any other suitable information for use in generating the report. The user interface may be configured to allow the user to specify criteria for any of the selected fields and/or properties, as described above with respect to manual report generation screens 524. The user may specify a frequency for the report and the user may select a create report button to initiate generation of the report and/or schedule the report for later generation.

Returning again to FIG. 5A, front-end systems may generate other screens including report administration screens 526 and report validation screens 528. Report administration screens 526 may be operable to allow user and/or administrative users to setup system options and manage accounts and entities in the supplemental report data generation system 500. For example, one function of report administration screens 526 may be to allow users to define product groups or fund families. As another example, report administration screens 526 may allow users to define pre-built reports. As yet another example, report administration screens 526 may allow users to define delivery options associated with a particular entity or product group and to define default and/or permitted delivery options. Report administration screens 526 may, in some embodiments, allow a user to define a responsible analyst/user that is responsible for managing reports for the fund family. Report validation screens 528 may support validation of reports by users, such as by facilitating review of generated reports for accuracy. For example, report validation screens 528 may include error-checking logic that identifies common errors in reports and prompts a user for correction.

An example user interface that may be associated with report administration screens 526 is illustrated in FIG. 11E. The example user interface illustrated in FIG. 11E may be generated by front-end systems 520 and presented to an organization user 501 on a display, such as a computer monitor or other display screen. FIG. 11E illustrates a modify product group user interface 1150 that may be generated by the front-end systems to allow a user to modify an existing product group or fund family within the supplemental report generation system. In some embodiments, user interface 1150 may also allow users to create a new fund family and/or product group. Additionally and/or alternative, similar screens may be provided to allow a user to define a new fund family. As illustrated in the example of FIG. 11E, in some embodiments a user may define a product group by specifying a product group name. The user may define one or more products/funds that belong to that product group, and the user interface may allow users to add, remove, and modify products in the product group. A user viewing the report administration screens 526, such as the example in user interface 1150, may be able to view scheduled reports corresponding to the product group and/or fund family. The information about the scheduled reports may include, for example, a report name, a report type, a last run date, a frequency, and a delivery option. Any other suitable information may also be included to identify the scheduled report associated with the product group. Users may also be able to define a delivery mode for the product group, such as publishing to an external facing website, emailing to an address associated with the product group, and/or any other suitable delivery method.

Returning once more to FIG. 5A, back end systems 530 may comprise operational data stores storing operational data for use in managing transactions of a representative account associated with a plurality of customers. In the embodiment illustrated in FIG. 5A, back end systems 530 may comprise transaction record data store 536 and report definition and rules data store 538. The operational data stores of back end systems 530 may be configured using any suitable techniques and technology, such as through a data warehousing platform and/or using one or more databases.

Transaction record data store 536 may store information regarding transactions made by the representative account on behalf of the plurality of clients. Transaction records 531a-531n may include any suitable information about transactions made by the representative account and may be organized as a data structure having one or more fields and/or data elements. For example, transaction record 531a comprises transaction data 533a and operational attribute data 535a. Example fields for transaction data 533a for each asset/product that is purchased/sold may include: CUSIP or other identifier of the asset, price, quantity, date, time, state of sale, underlying customer, repeat subscription status, type of transaction, and/or any other suitable transaction property or attribute.

Operational attribute data 535a may comprise information regarding an underlying customer of the representative account for whom the transaction was executed (e.g., the customer who benefited and/or was otherwise affected by the transaction). Operational attribute information may include any suitable information about the nature of the underlying customer for the transaction. Example fields for operational attributes may include: state of residence, country/county/city of residence, zip code, investor classification, years of experience investing, type of relationship with an institution maintaining the representative account, duration of relationship with the institution, total assets under management, current and past holdings, transaction history, current and past dividend elections, fee structures, disclosure settings, and/or any other suitable operational attribute or information relevant to forecasting and/or compliance.

Report definition and rules data store 538 may store previously configured sets of criteria for generating supplemental data reports. For example, report definition and rules data store 538 may store a set of criteria for a monthly state of sale report for an asset. Based on a schedule setting in the set of criteria for the report, supplemental data report generation device 510 may automatically initiate generation of a supplemental data report according to the set of criteria with the scheduled frequency. Report definition and rules data store 538 may also store one or more reporting rules for use in generating supplemental data reports. For example, report definition and rules data store 538 may store fee exemption rules for all 50 US states and supplemental data report generation system 510 may access the stored fee exemption rules when generating a supplemental data report for fees associated with transaction having a particular state of sale.

Once generated by supplemental data report generation system 510, the supplemental data report may be stored in report staging data store 540 for review and approval by organization users 501. Front-end systems 520 (such as through report view and publish screens 522) may allow users to view generated supplemental data reports, modify a selected report, and select a report for publishing to an external facing website or for other delivery to a third party (as described above with respect to FIGS. 11A-11B). Reports may be optionally moved to report archive data store 545 for retention purposes.

When a report receives user approval for publishing, the report may be moved to publishing platform 550. Publishing platform 550 may comprise an external facing website 555 or a network accessible file share, in some embodiments. Third party systems operated by third party users 502 may access publishing platform 550 via external facing website 555 and view/download the published reports. In some embodiments, external facing website 555 may allow authorized third party users 502 limited ability to request the generation of supplemental data reports. For example, the website 555 may allow authorized users to request certain routine pre-defined reports that an administrative user 501 has enabled for the authorized third party user 502. Optionally, an organization customer service desk 560 may view published reports and facilitate access by third party users 502 and facilitate feedback and/or communication between third party users 502 and organization user 501.

FIG. 5B illustrates an alternative implementation of a computing environment 590 for generating supplemental data reports for transactions of a representative account in accordance with one or more example embodiments. As with computing environment 500 of FIG. 5A, computing environment 590 of FIG. 5B may include a supplemental data report generation system 510 (which may correspond to supplemental data report generation device 100 of FIG. 1), front-end systems 520, back-end systems 530, report staging data store 540, report archive data store 545, and publishing platform 550. Generally, the components in computing environment 590 perform similar roles as those described above with respect to computing environment 500 of FIG. 5A.

As described above, back end systems 530 may comprise operational data stores storing operational data for use in managing transactions of a representative account associated with a plurality of customers. However, FIG. 5B illustrates an alternative embodiment wherein back end systems 530 comprise operational attribute data store 532, transaction record data store 536, representative account book table 534, and/or report definition data store 538. In the example illustrated in FIG. 5B, operational attribute data is stored in a separate operational attribute data store 532 rather than or in addition to being stored as part of the transaction records in transaction record data store 536. Operational attributes describing the nature of the underlying customers associated with a plurality of transactions may be identified using operational attribute data store 532, in some embodiments. Transaction records may contain a limited set of operational attributes and/or a reference to an operational attribute record in operational attributes data store 532. For example, a transaction record may include a state of sale for a transaction but may omit information about the underlying customer's current exposure to the asset involved in the transaction. As another example, a transaction record may include an identifier of the corresponding operational attribute record in the operational attribute data store 532 and the supplemental data report generation system 510 may retrieve the relevant operational attributes from the operational attribute data store 532. As noted above, the operational data stores of back end systems 530 may be configured using any suitable techniques and technology, such as through a data warehousing platform and/or using one or more databases.

Operational attribute data store 532 may store information regarding an underlying customer of the representative account. A transaction record stored in the transaction record data store 536 may include a reference to an operational attribute record stored in operational attribute data store 532, indicating that the corresponding customer was the underlying customer for the transaction associated with the transaction record. Operational attribute information may include any suitable information about the nature of the underlying customer for the transaction, as described above. Example fields for operational attributes may include: state of residence, country/county/city of residence, zip code, investor classification, years of experience investing, type of relationship with an institution maintaining the representative account, duration of relationship with the institution, total assets under management, current and past holdings, transaction history, current and past dividend elections, fee structures, disclosure settings, and/or any other suitable operational attribute or information relevant to forecasting and/or compliance.

FIG. 5B also illustrates and alternative embodiment utilizing a representative account book table 534 stored as part of or in addition to the transaction records stored in transaction record data store 536. Book table 534 may store information regarding current holdings of the representative account as well as allocations of those holdings to the plurality of customers represented by the representative account. For example, current holdings may be identified by a CUSIP identifier of an asset, a value of the total holdings in that asset, and an allocation schedule for the plurality of customers. In some embodiments, transaction record data store 536 may store book table 534 as an up-to-date list of current holdings. This may facilitate quick identification of current holdings associated with a product group by the supplemental data report system without needing to iterate over all opening and closing transactions in the transaction record data store.

Additional details regarding the information flows between components of operating environments 500 of FIGS. 5A and 590 of FIG. 5B are provided further below in regard to FIGS. 6A and 6B.

Figure 6A:
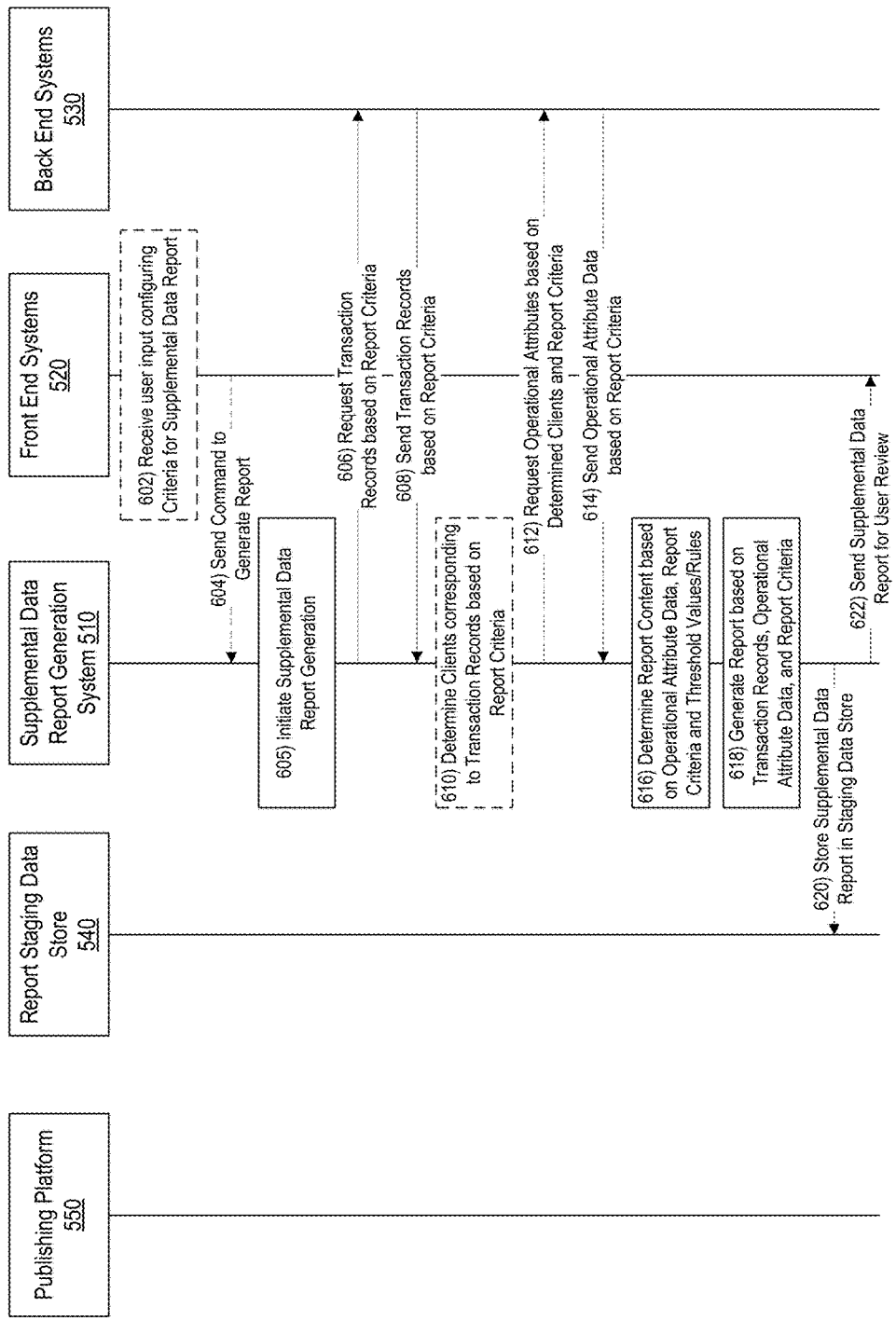
FIGS. 6A and 6B depict illustrative system flow diagrams for providing supplemental data reporting for transactions of a representative account in accordance with one or more example embodiments.
Figure 6B:
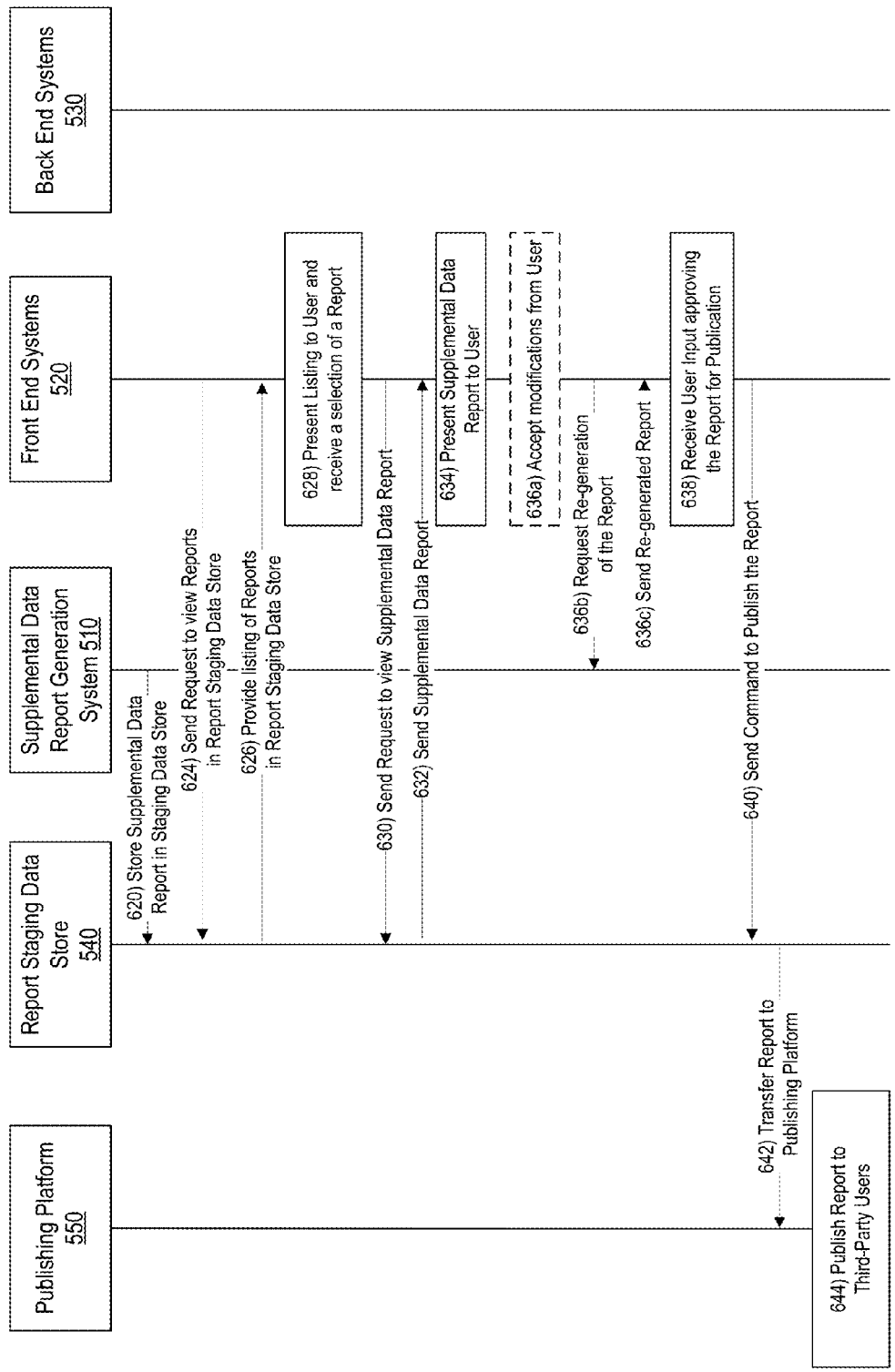

FIGS. 6A and 6B illustrate an illustrative process flow among supplemental data report generation system 510, front-end systems 520, back-end systems 530, report staging data store 540, and publishing platform 550.

Beginning with FIG. 6A, at optional step 602 front end systems 520 may receive user input configuring criteria for a supplemental data report (see, e.g., user interfaces 1130 and 1140 of FIGS. 11C and 11D). For example, a user may request that the system generate a State of Sale report for a fund family offered by Fund Company 1 during the most recent quarter. The user may select a pre-defined set of report criteria to be used in generating the report. Additionally or alternatively, the user may define a custom set of criteria for use in generating the report. The set of criteria may include rules regarding one or more transaction properties for use in generating the report and/or rules regarding one or more customer attributes for use in generating the report. Continuing the state of sale example, the user may define that the report should cover transactions in a particular state, such as Texas, and that the report should break out customers by customer type (e.g. retail, managed, institutional). The criteria may also include compound criteria, such as a rule that transactions from Texas should be flagged if they are a second or subsequent subscription.

At optional step 604, if a set of report criteria has been received from the user, front end systems 520 may send a command to the supplemental data report generation system 510 instructing the system 510 to begin generation of the supplemental data report. The request may include the criteria selected by the user, such as the state of sale criteria described in the example above.

In some embodiments, front-end systems 520 may store the criteria in a report definition data store 538 for later generation of the supplemental data report. Where the criteria specify a date and/or time for running the supplemental data report, front-end systems may wait until the specified date/time to send the command or may instruct the report definition data store to initiate the generation of the report at the proper time. Thus, at step 605, the supplemental data report generation system may determine to initiate generation of a supplemental data report. This may be in response to receiving a command from the front-end systems in response to user input requesting the generation of a supplemental data report. Additionally or alternatively, supplemental data report generation system 510 may initiate generation of a supplemental data report based on a scheduled report set to be automatically generated at predetermined intervals, such as where a user has scheduled a monthly report. In some embodiments, the supplemental data report generation system may retrieve one or more reporting rules from a report definition and rule data store 538 based on information included in the set of criteria, such as a given state of sale for the supplemental data report.

At step 606, the supplemental data report generation system 510 may request transaction records from the back-end systems 530 based on the report criteria. Transaction records may be stored by the back end systems 530 in transaction record data store 536. Transaction record data store 536 may store individual opening and closing transactions associated with the representative account (such as buy and sell orders, fund subscription orders, and/or any other suitable type of transaction). Transaction record data store 536 may, additionally or alternatively, store a current account book 534 which maintains transaction records identifying the current holdings of the representative account. As noted above, the representative account may be associated with a plurality of customers. The institution may handle transactions of the plurality of customers through the representative account. Transaction records stored in transaction record data store 536 may identify one or more customers of the plurality of customers as the customers on whose behalf the transaction was made.

In some arrangements, the individual transaction records may also include one or more operational attributes describing the nature of the underlying customer associated with the transaction. These operational attributes may be utilized by supplemental data report generation system 510 to generate the supplemental data report. In other embodiments, records of individual transactions may identify the customers(s) who were the underlying client for a buy or sell transaction but omit certain operational attributes that are stored in operational attribute data store 532. Supplemental data report generation system 510 may use a customer identifier or other reference to retrieve operational attribute data corresponding to the customer underlying a given transaction. In some arrangements, the transaction records stored in the account book table 534 may associate a current position with a subset of the customers in the representative account that own a given product.

In some embodiments, the request for transaction records may include one or more transaction properties and/or rules for selecting from among the transactions stored in the transaction record data store 536. For example, the request may indicate that only transactions having a particular state of sale be returned. At step 608, the back end systems 530 may send a plurality of transaction records back to the supplemental data report generation system 510 based on criteria included in the request for transaction records and/or the report criteria. Continuing the state of sale example introduced above, the back end systems 530 may send all transaction records of the representative account that are identified as having a state of sale of Texas.

As described above, in a first embodiment the transaction records may include operational attribute data describing one or more aspects of the nature of the underlying customer for a transaction. In such an embodiment, the supplemental data report generation system 510 may proceed to determine report content at step 616. However, in other embodiments, the transaction records may omit some and/or all of the operational attribute data and the supplemental data report generation system 510 may retrieve the relevant operational attribute data from operational attribute data store 532 in optional steps 610-614.

At optional step 610, the supplemental data report generation system 510 may determine one or more customers corresponding to the returned transaction records based on the report criteria. In some embodiments, the supplemental data report generation system 510 may first determine which of the returned transaction records meet one or more transaction criteria specified in the report criteria. For example, the supplemental data report generation system 510 may determine which of the returned transactions have a particular state of sale, such as those transactions having a Texas state of sale in the example above. Once the supplemental data report generation system 510 has identified the appropriate transaction records, in some embodiments, the supplemental data report generation system 510 may determine a subset of the plurality of customers represented by the representative account that are associated with the transaction records. The system may determine which customers of all customers in the representative account are associated with a group of products specified in the report criteria. For example, customers who participate in the representative account but have not bought securities or funds from a group specified in the criteria may be omitted from the report. Even if a customer has bought funds from a given fund group, they may be omitted from the report if their purchase did not meet other criteria included in the criteria for the report. Continuing the state of sale example, the supplemental data report generation system 510 may determine which customers of the plurality of customers represented by the representative account were associated with transactions having a Texas state of sale.

At optional step 612, the supplemental data report generation system 510 may send a request for operational attributes corresponding to client identifiers in the transaction records to back end system 530 based on the determined subset of customers associated with the transactions and the report criteria. For example, the request for operational attributes may include a listing of customers identifiers determined to be involved with the relevant transaction. The request may include one or more operational attribute field identifiers to be returned in the operational attribute records and, in some embodiments, one or more rules for filtering the returned operational attribute data. In the state of sale example discussed above, the request may include a list of the customers identified in Texas transactions and may indicate that the operational attribute data store 532 should return information regarding the classification of each customer.

At optional step 614, the back end systems 530 (such as through operational attribute data store 532) may return one or more operational attribute records to the supplemental data report generation system 510 based on criteria included in the request and the report criteria. In some embodiments, the operational attribute data store 532 may return operational attribute records for the use of the supplemental data report generation system 510. In other embodiments, the operational attribute data store 532 may return limited portions of the operational attribute records based on the criteria included in the request and the report criteria.

At step 616, the supplemental data report generation system 510 may determine content to be included in the supplemental data report based on the transaction records, the operational attribute data, the report criteria, and/or any threshold values/rules for the supplemental data report. The supplemental data report generation system 510 may review each of the returned transaction records and associated operational attributes and determine which transactions meet one or more reporting rules specified in the report criteria and/or associated with a transaction property of the report criteria. In some embodiments, the supplemental data report generation system 510 may look up a reporting rule in report definition and rules data store 538 and/or other source based on a transaction property specified in the report criteria. For example, where the transaction property is that the state of sale is Texas, the supplemental data report generation system 510 may look up one or more reporting rules associated with the state of Texas. The reporting rule may comprise a fee exemption rule, such as a fee exemption based on the type of customer. For example, Texas may excuse fund companies from various transaction fees if the underlying customer is an institutional investor rather than a retail investor.

In some embodiments, step 616 may comprise determining a subset of the customers/transactions associated with the transaction records for inclusion in the supplemental data report based on the reporting rules. In some embodiments, the reporting rules may include a threshold rule for selecting customers/transactions for inclusion in the supplemental data report based on one or more threshold values. The threshold rule may be associated with a field of the operational attribute fields stored in the back end systems 530.

Additionally or alternatively, the threshold rule may be based on one or more attributes of the set of products and the supplemental data report generation system 510 may use product information corresponding to one or more attributes of the set of products to determine the threshold rule. As one example, the set of products may comprise a family of mutual funds and the one or more attributes may comprise a size of each respective mutual fund of the family of mutual funds. In some embodiments, the system may calculate a threshold value and the threshold rule may be based on the threshold value. For example, the system may calculate a threshold value by calculating a percentage of the size of a mutual fund based on the product information. The threshold rule associated with that threshold value may be a test whether a given customer owns more than the threshold percentage of the fund's size. Customers that own more than the threshold value may be included in the report.

In some arrangements, step 616 may comprise determining what operational attributes and transaction information should be included in the supplemental data report based on the report criteria and/or system settings. For example, the report criteria may indicate that the supplemental data report generation system should include a customer name in a concentration report for customers that meet a threshold holding rule, such as 0.5% of a fund. As another example, the report criteria may indicate that the report should include a percentage breakdown of the customers having certain attributes. Continuing the state of sale example from above, the report criteria may cause the supplemental data report generation system 510 to include client type information (such as the customer's status as retail, managed, institutional) in the report. The criteria may further specify that the percentages comprised by each type of client be calculated and included in the report. For example, the report may indicate that X % of the subset of customers associated with a specified product are institutional investors, while Y % are retail.

Step 616 may comprise generating one or more aggregate metrics based on the operational attributes associated with the relevant transaction records. Some example aggregate metrics include averages of operational attributes, medians and quartile calculations for the operational attributes, statistical analysis of the operational attributes and/or statistical analysis of the subset of customers associated with the relevant transactions, percentage breakouts as described above, sums, and/or any other suitable calculated value based on one or more operational attributes associated with the responsive/relevant transactions. Some operational attributes may be deemed personally identifiable material, usable to identify the customer from other customers. The institution maintaining the representative account on behalf of the customers may seek to avoid unnecessarily disclosing the identity of the customers in the representative account. Use of aggregate metrics in supplemental data reporting may provide fund companies with useful information for risk management, liquidity projection, and regulatory compliance while avoiding unnecessary disclosure of other customer details.

At step 618, the supplemental data generation system 510 may generate the supplemental data report based on the transaction records, operational attributes, and report criteria. The report may be generated based on the operational attributes included in the relevant transaction records (e.g., those that meet the criteria for the report) and/or operational attributes determined in step 616. In some embodiments, the report may include aggregate metrics calculated based on the operational attributes. The aggregate metrics may be included in lieu of the actual operational attributes themselves in order to limit unnecessary disclosure of customer details, in some embodiments. The supplemental data report may be generated using a form and/or template report that describes the layout, content, formatting, fields, and/or other suitable information for generating the supplemental data report. Once generated, the supplemental data report may be stored in staging data store 540 at step 620 and/or sent to front-end systems 520 for user review at step 622.

FIG. 6B continues the data flow of FIG. 6A starting from step 620, where the supplemental data report may be stored in staging data store 540. At step 624, front end systems 520 may send a request to view reports stored in the report staging data store 540. At step 626, report staging data store 540 may send a listing of the stored reports to front end systems 520.

At step 628, front end systems 520 may generate a user interface presenting the listing of stored supplemental data reports to a user for selection (see, e.g., view and publish user interface 1110 of FIG. 11A). The user interface may be displayed as a list of files and links to open those files for review, in some embodiments. In some arrangements, the list of supplemental data reports stored in the report staging data store 540 may be viewed using a file manager. The user interface may display additional information about the reports, such as a name of the report, a run date of the reports, a report type of the reports, and a link to open and/or review the report. The user interface may allow users to delete, modify, and/or publish reports that are stored in the report staging data store 540. Front end systems 520 may receive a selection of a supplemental data report from the user, such as in response to user input via the user interface.

At step 630, front end systems 520 may send a request to the report staging data store to retrieve the selected supplemental data report for viewing. At step 632, report staging data store may send the supplemental data report to front end systems 520 for viewing.

At step 634, front end systems 520 may generate a user interface comprising a display of the supplemental data report and allow a user to review the content of the selected supplemental data report (see, e.g., user interface 1120 of FIG. 11B). The user interface may include metadata regarding attributes of the report such as a name of the report, a creation date, a report type, a set of criteria used to generate the report, notes about the report, and/or any other suitable data about the report.

In some embodiments, the user interface may allow the user to edit one or more aspects of the report, such as adding, removing, and changing content of the report. At optional step 636*a*, the system may accept modifications from a reviewing user. The user interface may allow the user to edit the criteria used to generate the supplemental data report, and front end systems 520 may request that the supplemental data report generation system 510 re-generate or re-run the report with the modified criteria at step 636*b*. After the modified report is generated, the supplemental data report generation system 510 may return the re-generated report to front end systems 520 which may display the modified report at step 636*c*.

At step 638, front end systems 520 may receive user input approving the supplemental data report for publication. Once the user has reviewed the supplemental data report, the user may indicate that the report should be published to publishing platform 550 and made available to third party users. The user may select a control on a user interface to initiate publication of the report. Additionally and/or alternatively, the user may select a control to schedule the report for later publication. Reports selected for publication may also be saved to report archive data store 545.

At step 640, front end systems 520 may send a command to the report staging data store 540 to publish the supplemental data report and, at step 642, report staging data store 540 may transfer the selected supplemental data report to the publishing platform 550. At step 644, publishing platform 550 may make the report available to authorized third party users. For example, publishing platform 550 may make the report available for download through an external facing website. The website may list reports available for a given fund manager to download for fund families associated with the given fund manager. Additionally and/or alternatively, the report may be made available through a File Transfer Protocol (FTP) site or other file transfer service.

Having discussed the operating environment for the supplemental data report generation system illustrated in FIGS. 5A and 5B, and the data flows illustrated in FIGS. 6A and 6B, discussion will now turn to methods of generating supplemental data reports according to one or more aspects described herein, as depicted in FIGS. 7A, 7B, and 8-10.

The methods illustrated in FIGS. 7A, 7B, and 8-10 may be performed by a special-purpose computing device, such as supplemental data report generation device 100. The methods may be performed by and or embodied in supplemental data report generation system 510, front end systems 520, back end systems 530, and or any other suitable combination thereof. Although discussed briefly here, it is to be understood that the varied features discussed above with respect to FIGS. 5A, 5B, 6A, and 6B may be incorporated in the methods illustrated in FIGS. 7A, 7B, and 8-10 as appropriate.

Figure 7A:
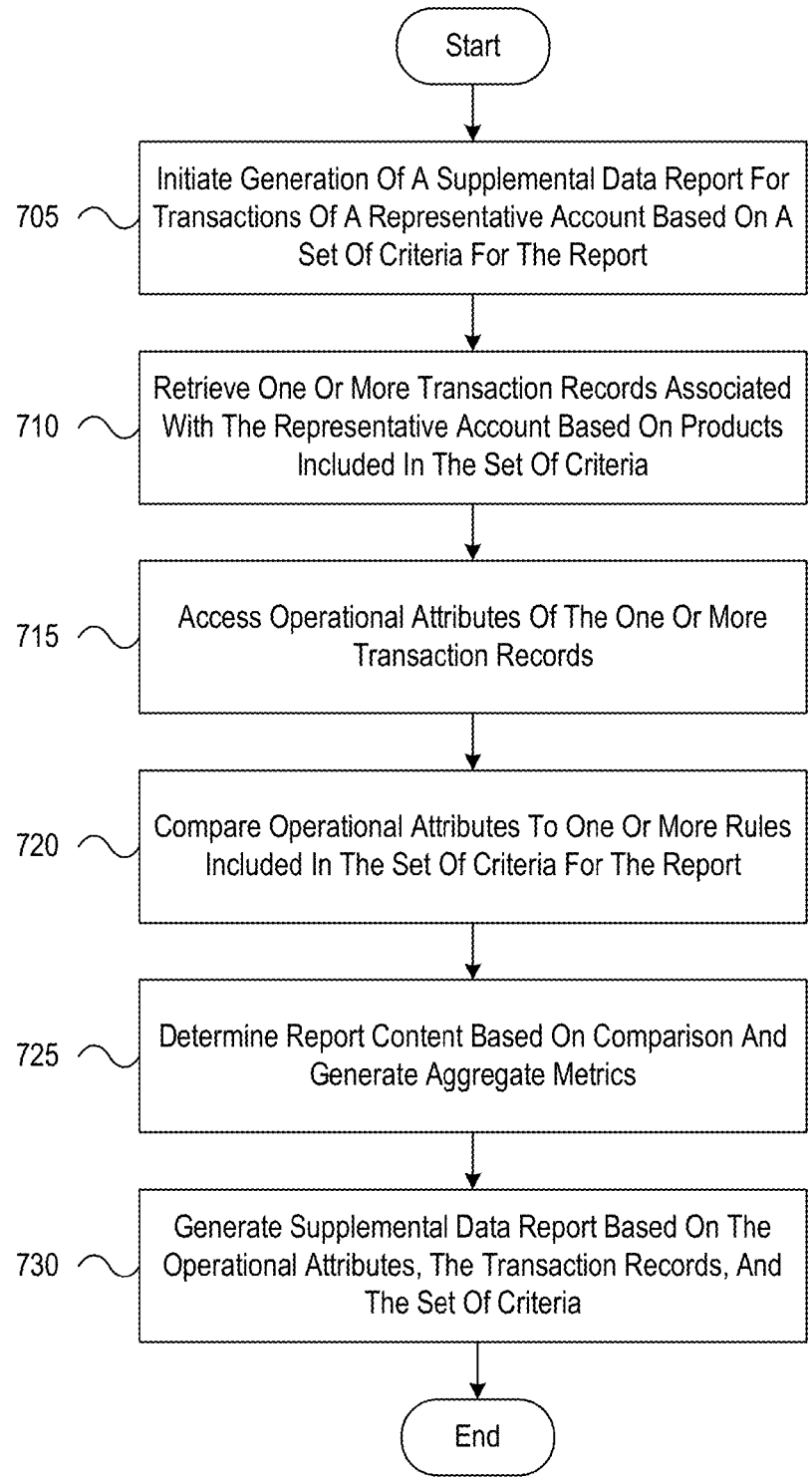
FIGS. 7A and 7B illustrate two example methods for generating a supplemental data report for transactions of a representative account in accordance with one or more example embodiments.

FIG. 7A illustrates an example method of generating a supplemental data report for transactions of a representative account based on a set of criteria for the report in accordance with one or more example embodiments. The representative account may be associated with a first plurality of customers. At step 705, a supplemental data report generation device may determine to initiate generation of a supplemental data report for transactions of the representative account based on a set of criteria for the report. As discussed above, in some embodiments the supplemental data report generation device may receive a request to initiate the generation of the supplemental data report from a front end device in response to user input. In some embodiments, the set of criteria for the report may be retrieved from a report definition data store. The supplemental data report generation device may also determine to initiate the generation of the report based on a scheduled report, such as a report set to run at regular intervals (e.g. monthly, weekly).

At step 710, the supplemental data report generation device may retrieve one or more transaction records associated with the representative account based on a set of products included in the set of criteria. For example, the set of criteria may identify a particular fund family as the subject of the supplemental data report. At step 715, the supplemental data report generation device may access operational attributes associated with the one or more transaction records. At step 720, the supplemental data report generation device may compare the operational attributes associated with the one or more transaction records with the set of criteria for the report. In some embodiments, the set of criteria provided by the user or stored in the report data store may comprise one or more rules. In other embodiments, the supplemental data report generation device may look up one or more rules associated with one or more transaction properties included in the set of criteria. Based on the comparison, the supplemental data report generation device may determine which transaction records are relevant/responsive to the set of criteria for the supplemental data report. At step 725, the supplemental data report generation device may determine suitable operational attribute information and transaction information for inclusion in the report based on the transaction records, operational attributes, and the set of criteria for the report. The supplemental data report generation device may further calculate and/or otherwise generate one or more aggregate metrics based on the operational attributes for inclusion in the supplemental data report. At step 730, the supplemental data report generation device may generate the supplemental data report based on the transaction records determined to meet the set of criteria for the report, the relevant operational attributes, and the set of criteria for the report. The generated report may be stored in a report staging data store for review and publication by a user.

Figure 7B:
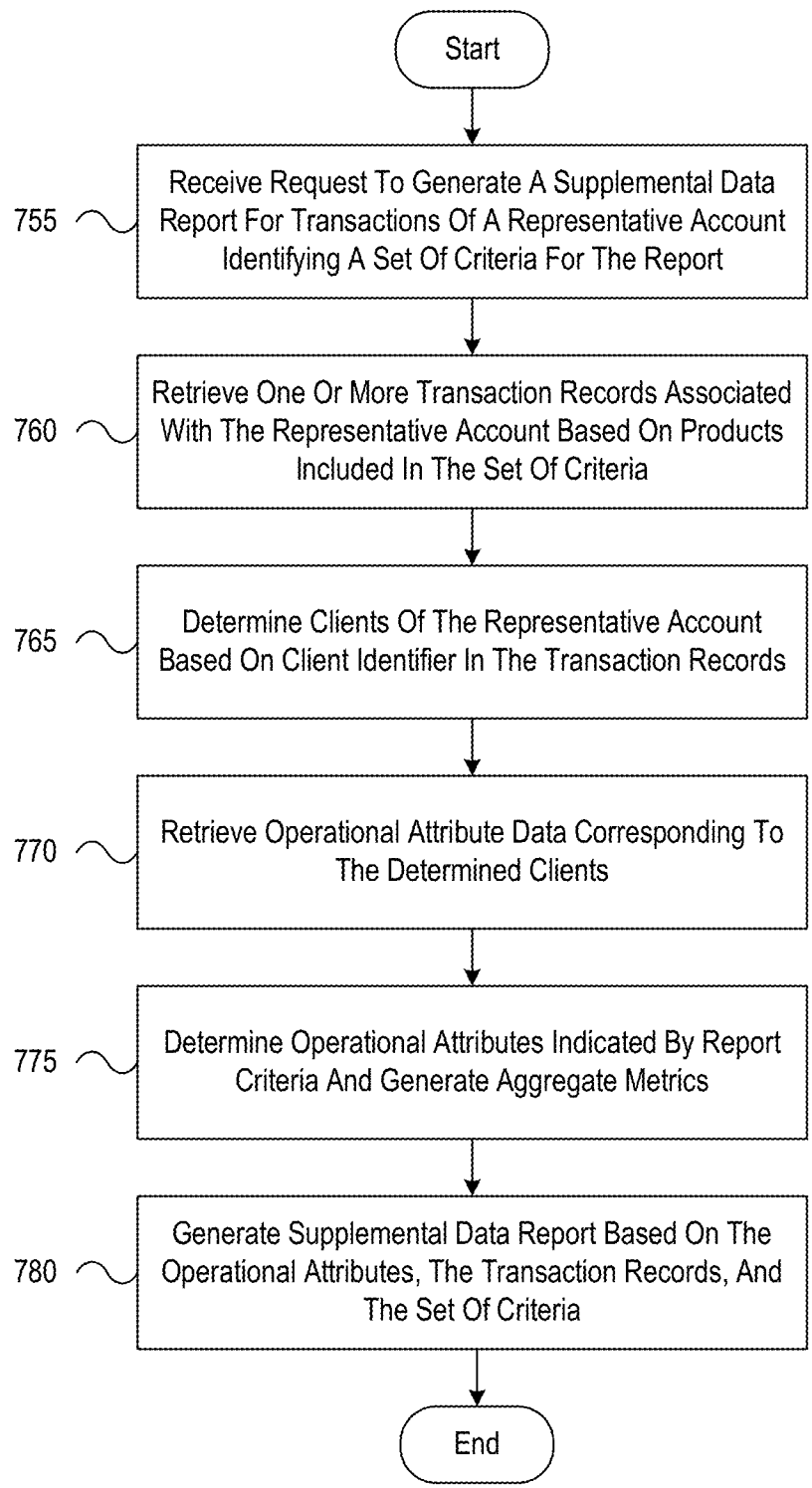

As described above with respect to FIGS. 5A and 5B, the operational attributes may be stored as part of the transaction records in some embodiments, and/or the operational attributes may be stored as part of a separate operational attribute data store in other embodiments. FIG. 7B illustrates an alternative method of generating a supplemental data report for transactions of a representative account based on a set of criteria for the report in accordance with one or more example embodiments. The method illustrated in FIG. 7B may retrieve operational attribute data from an operational attribute data store based on a client identifier included in the transaction records that meet the criteria for the supplemental data report.

At step 755, a supplemental data report generation device may receive a request to generate a supplemental data report for transactions of a representative account. The request may identify a set of criteria for the report. As discussed above with respect to FIGS. 5A, 5B, and 6A, the request may be generated by a front end device in response to user input.

At step 760, the supplemental data report generation device may retrieve one or more transaction records associated with the representative account based on a set of products included in the set of criteria. For example, the set of criteria may identify a particular fund family as the subject of the supplemental data report. At step 765, the supplemental data report generation device may determine a second plurality of customers selected from the first plurality of customers based on client identifiers in the transaction records. At step 770, the supplemental data report generation device may retrieve operational attribute data corresponding to the second plurality of customers. At step 775, the supplemental data report generation device may determine suitable operational attributes for inclusion in the report based on the transaction records and the set of criteria for the report. The supplemental data report generation device may further calculate and/or otherwise generate one or more aggregate metrics based on the operational attributes for inclusion in the supplemental data report. At step 780, the supplemental data report generation device may generate the supplemental data report based on the responsive/relevant, the transaction records, the operational attributes, and the set of criteria for the report. The generated report may be stored in a report staging data store for review and publication by a user.

Figure 8:
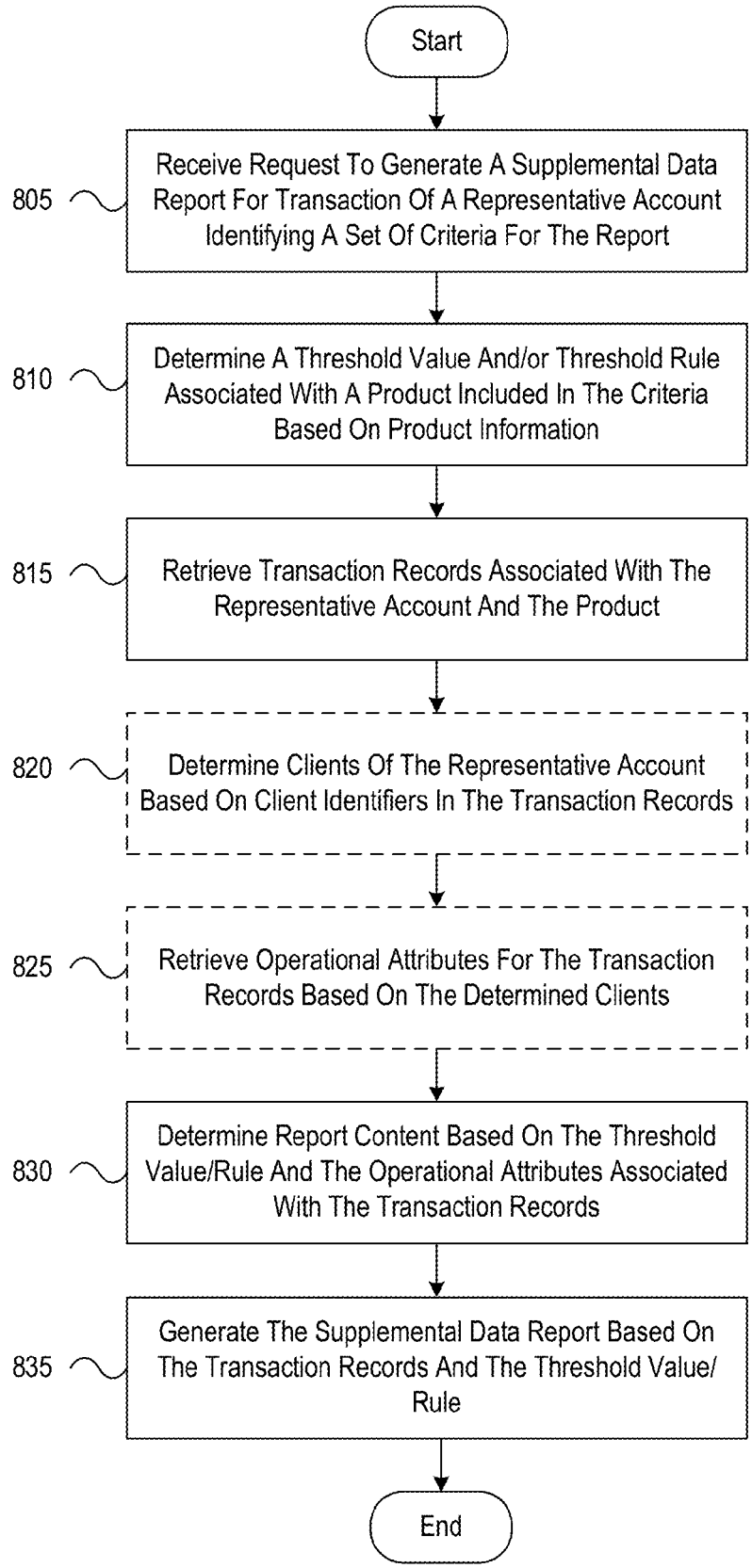
FIG. 8 illustrates another example method for generating a supplemental data report for transactions of a representative account in accordance with one or more example embodiments.

FIG. 8 illustrates another example method of generating a supplemental data report for transactions of a representative account based on a set of criteria for the report in accordance with one or more example embodiments. The method of FIG. 8 may determine and consider a threshold value associated with a product included in the set of criteria for the supplemental data report. At step 805, a supplemental data report generation device may receive a request to generate a supplemental data report for transactions of a representative account. The request may identify a set of criteria for the report. As discussed above with respect to FIGS. 5A, 5B, and 6A, the request may be generated by a front end device in response to user input.

At step 810, the supplemental data report generation device may determine a threshold value and/or threshold rule associated with a product included in the set of criteria. The threshold value and/or threshold rule may be determined based on product information regarding one or more attributes of the product. For example, the threshold value may be determined based on a fund size of a mutual fund product by determining a value that represents 5% of the fund size. The threshold rule in such an example may be that customers who own more than the threshold value, e.g. 5% of the fund size, should be included in the report. At step 815, the supplemental data report generation device may retrieve transaction records associated with the representative account and the product. In some embodiments, the transaction records may include the relevant operational attribute information and the supplemental data report generation device may proceed to determine content for the report at step 830.

At optional step 820, the supplemental data report generation device may determine clients of the representative account that are associated with the retrieved transaction records. For example, in some embodiments the representative account may consist of a first plurality of clients, and the clients that are associated with the retrieved transaction records may be a second plurality of customers comprising less than all of the clients in the representative account (e.g. a subset of the first plurality of customers). The retrieved transaction records may include client identifiers and/or other references suitable to identify an operational attribute data record stored in operational attribute data store. At optional step 825, the supplemental data report generation device may retrieve operational attributes corresponding to the determined clients associated with the relevant transactions.

At step 830, the supplemental data report generation device may determine a further subset of the second plurality of customers that meet the determined threshold value and/or threshold rule. The supplemental data report generation device may review operational attributes associated with each customer of the second plurality of customers to determine which customers satisfy the threshold rule. For example, the supplemental data report generation device may determine that a customer should be included in the supplemental data report based on the threshold rule if the customer owns more than a threshold percentage of the fund's total size.

At step 835, the supplemental data report generation device may generate the supplemental data report based on the determined subset of customers, the determined threshold value, the transaction records, the operational attributes, and the set of criteria for the report. The generated report may be stored in a report staging data store for review and publication by a user.

Figure 9:
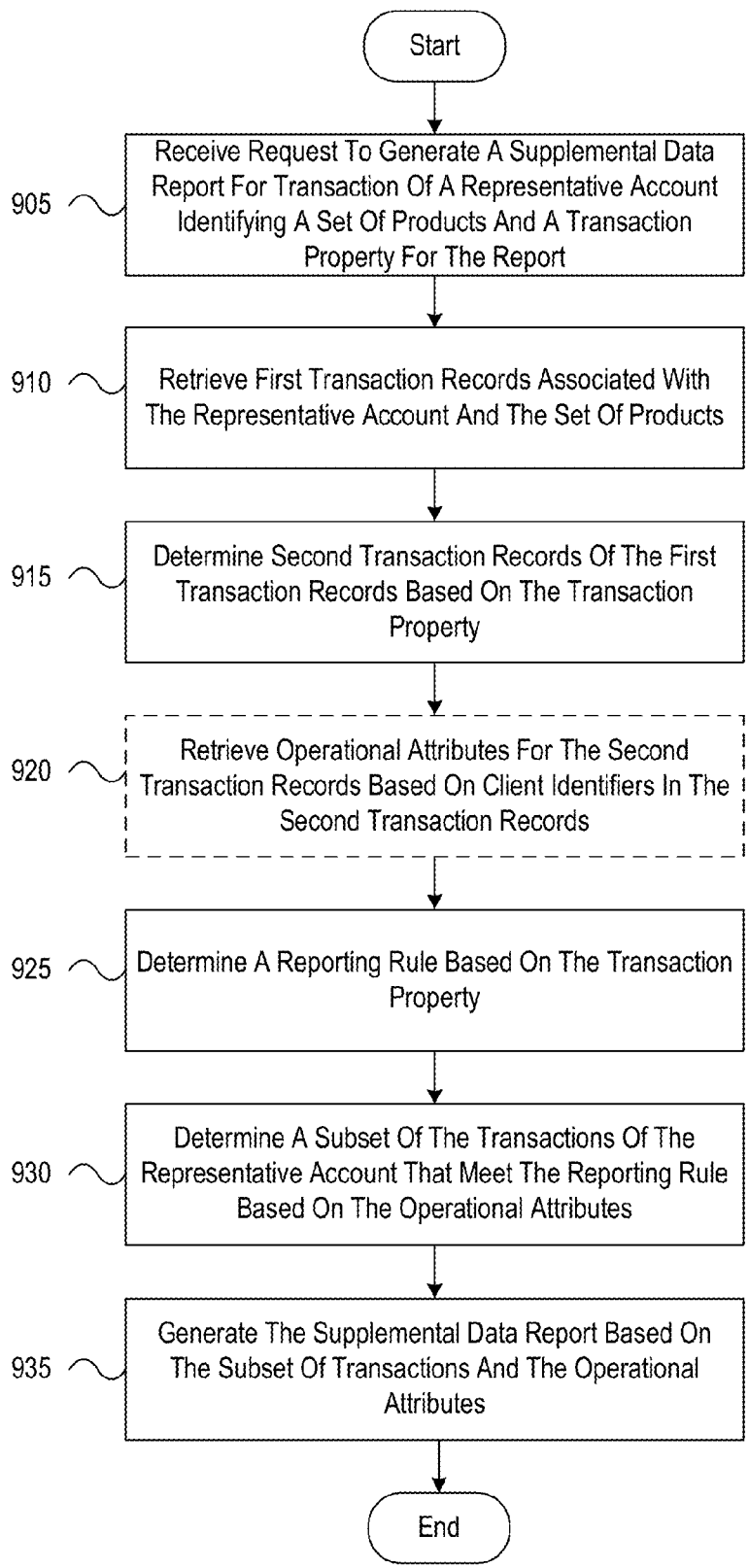
FIG. 9 illustrates yet another example method for generating a supplemental data report for transactions of a representative account in accordance with one or more example embodiments.

FIG. 9 illustrates another example method of generating a supplemental data report for transactions of a representative account based on a set of criteria for the report in accordance with one or more example embodiments. The method of FIG. 9 may accept a transaction property as part of the set of criteria for the supplemental data report. At step

905, a supplemental data report generation device may receive a request to generate a supplemental data report for transactions of a representative account. The request may identify a set of criteria for the report, such as a set of products to be covered by the report and a transaction property used to select transactions that will be included in the report. As discussed above with respect to FIGS. 5A, 5B, and 6A, the request may be generated by a front end device in response to user input.

At step 910, the supplemental data report generation device may retrieve first transaction records associated with the representative account and the set of products. At step 915, the supplemental data report generation device may determine second transaction records of the first transaction records based on records of the second transaction records having and/or matching the specified transaction property in the criteria for the report. In some embodiments, the retrieved transaction records may include operational attribute data therein. In other embodiments, at optional step 920, the supplemental data report generation device may retrieve operational attributes based on client identifiers in the second plurality of transaction records. At step 925, the supplemental data report generation device may determine a reporting rule based on the transaction property. For example, the transaction property may be a particular state of sale and the supplemental data report generation device may look up one or more reporting rules associated with that particular state. Additionally or alternatively, the reporting rule may be specified as part of the set of criteria. At step 930, the supplemental data report generation device may determine a subset of the first plurality of customers of the representative account. The subset of customers may be selected from the first plurality of customers based on customers of the subset meeting the reporting rule based on the retrieved operational attributes. At step 935, the supplemental data report generation device may generate the supplemental data report based on the subset of customers, the set of criteria for the report, the transaction records, the operational attributes, and the reporting rule.

Figure 10:
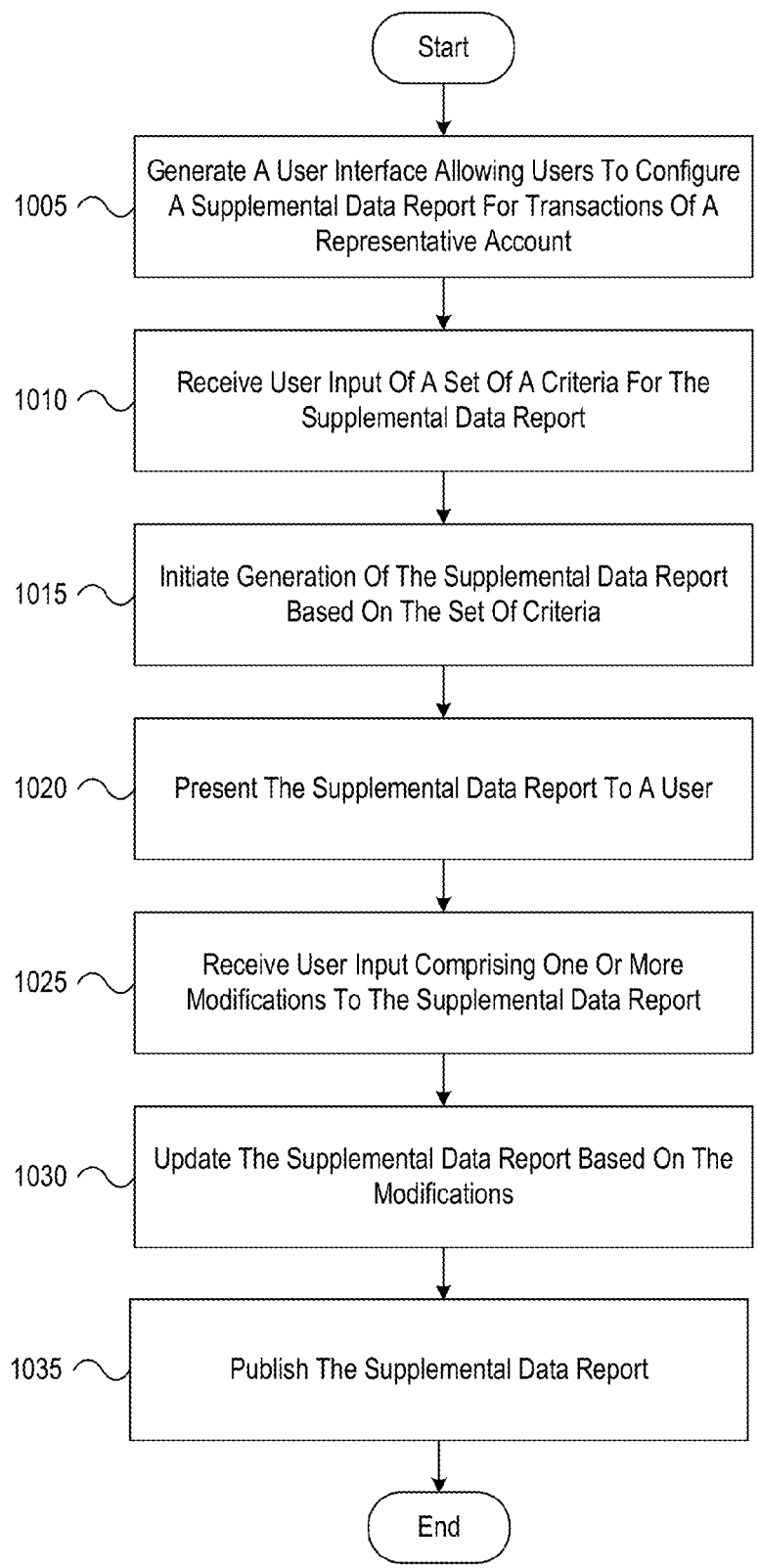
FIG. 10 illustrates an example method for providing a user interface allowing a user to configure generation of a supplemental data report for transactions of a representative account in accordance with one or more example embodiments.

FIG. 10 illustrates another example method of generating a supplemental data report for transactions of a representative account based on a set of criteria for the report in accordance with one or more example embodiments. The method of FIG. 10 relates to a front end system that allows configuration of supplemental data reports and presents generated supplemental data reports to a user for review and publication. At step 1005, a front end device, may generate a user interface allowing users to configure criteria for a supplemental data report for transactions of a representative account. The user interface may comprise one or more controls operable to define the criteria for the supplemental data report.

At step 1010, the front-end device may receive a user input of the set of criteria for the supplemental data report via the user interface. At step 1015, the front-end device may initiate generation of the supplemental data report based on the received criteria. In some embodiments, the user interface of steps 1005 and 1010 may be generated by a front end device. The front end device may initiate generation of the supplemental data report by a back end device by sending a message to the back end device to begin generation of the supplemental data report. The request may include the set of criteria for the report.

At step 1020, the front-end device may generate a display of the supplemental data report and present the display to a user. In some embodiments, the display of the supplemental data report may be presented in response to user selection of the supplemental data report from a list of reports stored in a report staging data store. At step 1025 the front-end device may receive user input comprising one or more modifications to the supplemental data report. At step 1030, the front-end device may update the supplemental data report and update the display of the supplemental data report to reflect the modifications. At step 1035, the front-end device may receive user input requesting to publish the supplemental data report to a publishing platform. This may make the report available to authorized third party users via a website or file service.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:
1. A system, comprising:
 a transaction record data store configured to store a plurality of transaction records associated with a representative account, wherein the representative account corresponds to a plurality of customers;

an operational attribute data store configured to store operational attributes associated with respective customers of the plurality of customers of the representative account;

a reporting rule data store configured to store one or more reporting rules associated with one or more transaction properties;

a report staging data store configured to store a plurality of reports; and a supplemental data report generation device comprising at least one processor and memory storing computer-readable instructions that, when executed by the at least one processor, cause the supplemental data report generation device to:

receive a set of criteria for a supplemental data report corresponding to transactions of the representative account, wherein the set of criteria comprises a set of products covered by the supplemental data report and a first transaction property;

retrieve, from the reporting rule data store, a first reporting rule based on the first transaction property;

retrieve, from the transaction record data store, one or more transaction records of the plurality of transaction records based on the set of products and first transaction property;

retrieve, from the operational attribute data store, a first set of operational attributes associated with the one or more transaction records based on a set of first customers identified in the one or more transaction records;

determine, based on the first set of operational attributes associated with the one or more transaction records, a subset of transaction records in the one or more transaction records that match the first reporting rule, wherein determining that a given transaction record matches the first reporting rule is based on a first operational attribute of a given customer associated with the given transaction record;

generate the supplemental data report based on the set of products, the subset of transaction records, and a second set of operational attributes associated with second customers identified in the subset of transaction records, wherein the supplemental data report includes one or more aggregate metrics in lieu of the first operational attribute of the given customer based on the first reporting rule; and store the supplemental data report in the report staging data store.

2. The system of claim 1, wherein the one or more transaction records retrieved from the transaction record data store include second operational attributes associated with each respective transaction record.

3. The system of claim 1, wherein the memory stores additional computer-readable instructions that, when executed by the at least one processor, further cause the supplemental data report generation device to:

calculate the one or more aggregate metrics associated with the set of products and the subset of transaction records based at least in part on portions of the second set of operational attributes that correspond to the first reporting rule, wherein the generated supplemental data report includes the one or more aggregate metrics in lieu of the portions of the second set of operational attributes.

4. The system of claim 1, wherein the system further comprises a report definition data store configured to store report criteria and initiate generation of the supplemental data report at predefined intervals, and wherein the supplemental data report generation device receives the set of criteria for the supplemental data report from the report definition data store.

5. The system of claim 1, wherein retrieving the one or more transaction records based on the set of products and the first transaction property comprises retrieving the one or more transaction records of the plurality of transaction records that correspond to a product in the set of products and have the first transaction property.

6. The system of claim 1, wherein the first transaction property comprises a state of sale.

7. The system of claim 6, wherein the first reporting rule comprises customer exemption criteria associated with the state of sale.

8. The system of claim 1, wherein the first reporting rule comprises a rule based on a client classification attribute.

9. The system of claim 1, wherein the transaction records correspond to mutual fund subscription transactions made by the representative account and the set of products comprises a defined family of mutual funds.

10. A method of generating a supplemental data report for transactions of a representative account corresponding to a first plurality of customers, the method comprising:

receiving, by a supplemental data report generation device, a set of criteria for the supplemental data report, wherein the set of criteria comprises a set of products covered by the supplemental data report and one or more transaction properties;

retrieving, by the supplemental data report generation device and from a reporting rule data store, a first reporting rule based on the one or more transaction properties;

retrieving, by the supplemental data report generation device and from a transaction data store, a first plurality of transaction records corresponding to the representative account based on the set of products;

determining, by the supplemental data report generation device, a second plurality of transaction records selected from the first plurality of transaction records based on a given transaction record having the one or more transaction properties;

retrieve, by the supplemental data report generation device and from an operational attribute data store, a first set of operational attributes corresponding to the second plurality of transaction records based on a set of first customers identified in the second plurality of transaction records;

determining, by the supplemental data report generation device and based on the first set of operational attributes corresponding to the second plurality of transaction records, a third plurality of transaction records that match the first reporting rule associated with the one or more transaction properties, wherein the third plurality of transaction records is a subset of the second plurality of transaction records and wherein determining that a particular transaction record of the second plurality of transaction records matches the first reporting rule is based on a first attribute of a given customer associated with the particular transaction record;

generating, by the supplemental data report generation device, the supplemental data report based on the third plurality of transaction records and the first set of operational attributes, wherein the supplemental data report includes one or more aggregate metrics in lieu of the first attribute of the given customer based on the first reporting rule; and storing the supplemental data report in a report staging data store.

11. The method of claim 10, wherein the first reporting rule is based on one or more fields of the first set of operational attributes, the method further comprising:
calculating the one or more aggregate metrics associated with the operational attributes corresponding to the third plurality of transaction records based at least in part on information contained in the one or more fields associated with the first reporting rule,
wherein the generated supplemental data report includes the one or more aggregate metrics and does not include the information contained in the one or more fields.

12. The method of claim 10, further comprising:
receiving, by the supplemental data report generation device, the set of criteria for the supplemental data report from a report definition data store.

13. The method of claim 10, wherein the one or more transaction properties comprise a state of sale and wherein the one or more reporting rules comprise customer exemption criteria associated with the state of sale.

\* \* \* \* \*